United States Patent
Nigg

(10) Patent No.: US 10,941,755 B2
(45) Date of Patent: Mar. 9, 2021

(54) SYSTEMS AND METHODS FOR CAPTURING KINETIC ENERGY AND FOR EMISSION-FREE CONVERSION OF CAPTURED ENERGY TO ELECTRICITY

(71) Applicant: Constructis Group, Inc., Greenville, SC (US)

(72) Inventor: James Leo Nigg, Greenville, SC (US)

(73) Assignee: Constructis Group, Inc., Greenville, SC (US)

( * ) Notice: Subject to any disclaimer, the term of this patent is extended or adjusted under 35 U.S.C. 154(b) by 0 days.

(21) Appl. No.: 16/288,749

(22) Filed: Feb. 28, 2019

(65) Prior Publication Data

US 2019/0264665 A1 Aug. 29, 2019

Related U.S. Application Data

(60) Provisional application No. 62/636,409, filed on Feb. 28, 2018.

(51) Int. Cl.
*F03G 7/00* (2006.01)
*F03G 7/08* (2006.01)
(Continued)

(52) U.S. Cl.
CPC ............... *F03G 7/08* (2013.01); *F03G 1/08* (2013.01); *F03G 2730/03* (2013.01); *H02K 7/108* (2013.01); *H02K 7/1853* (2013.01)

(58) Field of Classification Search
CPC ........ H02K 7/108; H02K 7/1853; F03G 1/08; F03G 2730/03; F03G 7/08
(Continued)

(56) References Cited

U.S. PATENT DOCUMENTS 3,859,589 A * 1/1975 Rush ...................... B60K 25/08
322/40
3,885,163 A * 5/1975 Toberman ............ H02K 7/1853
290/1 R (Continued)

FOREIGN PATENT DOCUMENTS

WO WO-2011/112723 A2 9/2011

OTHER PUBLICATIONS

International Search Report and Written Opinion for International Application No. PCT/US2019/01996, dated Jun. 5, 2019(13 pages).

*Primary Examiner* — Julio C. Gonzalez
(74) *Attorney, Agent, or Firm* — Goodwin Procter LLP

(57) ABSTRACT

A system for efficiently capturing the kinetic and/or potential energy of a moving vehicle includes an arc roller configured to move along an arcuate path upon impact by the moving vehicle, and a torsional spring configured to wind in response to the movement of the speed bump and, thereby, to store energy associated with the impact. The torsional spring may be configured to wind continually in response to the movement of another speed bump and, thereby, to store additional energy associated with the impact of the vehicle with the other speed bump. The system may include alternators or generators producing electricity from energy released from unwinding of the torsional spring. Electricity is further stored and utilized for onboard computing, traffic analytics, safety feature operating functions and communications.

28 Claims, 21 Drawing Sheets

(51) Int. Cl.
*F03G 1/08* (2006.01)
*H02K 7/108* (2006.01)
*H02K 7/18* (2006.01)

(58) Field of Classification Search
USPC .................. 290/1 R, 1 C; 60/325, 327, 398
See application file for complete search history.

(56) References Cited

U.S. PATENT DOCUMENTS

| | | | | |
|---|---|---|---|---|
| 3,944,855 | A * | 3/1976 | Le Van | H02K 7/1853 310/69 |
| 4,081,224 | A * | 3/1978 | Krupp | F03G 7/08 417/229 |
| 4,238,687 | A * | 12/1980 | Martinez | F03G 7/08 290/1 R |
| 4,239,975 | A * | 12/1980 | Chiappetti | F03G 7/08 290/1 R |
| 4,247,785 | A * | 1/1981 | Apgar | H02K 49/10 290/1 R |
| 4,614,875 | A * | 9/1986 | McGee | H02K 7/1853 290/1 C |
| 5,355,674 | A * | 10/1994 | Rosenberg | F04B 35/00 290/1 R |
| 6,353,270 | B1 * | 3/2002 | Sen | F03G 7/08 290/1 A |
| 6,494,144 | B1 * | 12/2002 | Perez Sanchez | F03G 7/08 104/287 |
| 6,767,161 | B1 * | 7/2004 | Calvo | F03G 7/08 290/1 R |
| 7,067,932 | B1 * | 6/2006 | Ghassemi | F03G 7/08 290/1 R |
| 7,714,456 | B1 * | 5/2010 | Daya | F03G 7/08 290/1 R |
| 8,461,700 | B2 * | 6/2013 | Kennedy | F03G 7/08 290/1 R |
| 8,928,160 | B2 * | 1/2015 | Jang | F03G 7/08 290/1 R |
| 2002/0089309 | A1 * | 7/2002 | Kenney | H02K 7/1853 322/1 |
| 2004/0042852 | A1 * | 3/2004 | Alperon | E01C 9/00 404/71 |
| 2004/0160058 | A1 * | 8/2004 | Gott | F03G 7/08 290/1 R |
| 2007/0264081 | A1 * | 11/2007 | Chiu | E01C 9/00 404/71 |
| 2009/0127865 | A1 | 5/2009 | Valentino | |
| 2011/0187125 | A1 * | 8/2011 | Jang | F03B 13/00 290/1 C |
| 2011/0215589 | A1 * | 9/2011 | Chen | E01C 9/00 290/1 C |
| 2011/0298222 | A1 * | 12/2011 | Bailey | H02K 7/1853 290/1 R |
| 2013/0334826 | A1 * | 12/2013 | Tort-Ortiz | H02K 7/1853 290/1 C |
| 2014/0299415 | A1 | 10/2014 | Barbiero | |
| 2015/0084344 | A1 * | 3/2015 | Turner | F03G 7/08 290/1 D |
| 2016/0025083 | A1 | 1/2016 | Shin | |
| 2018/0309344 | A1 * | 10/2018 | De Asis | F03G 7/08 |

* cited by examiner

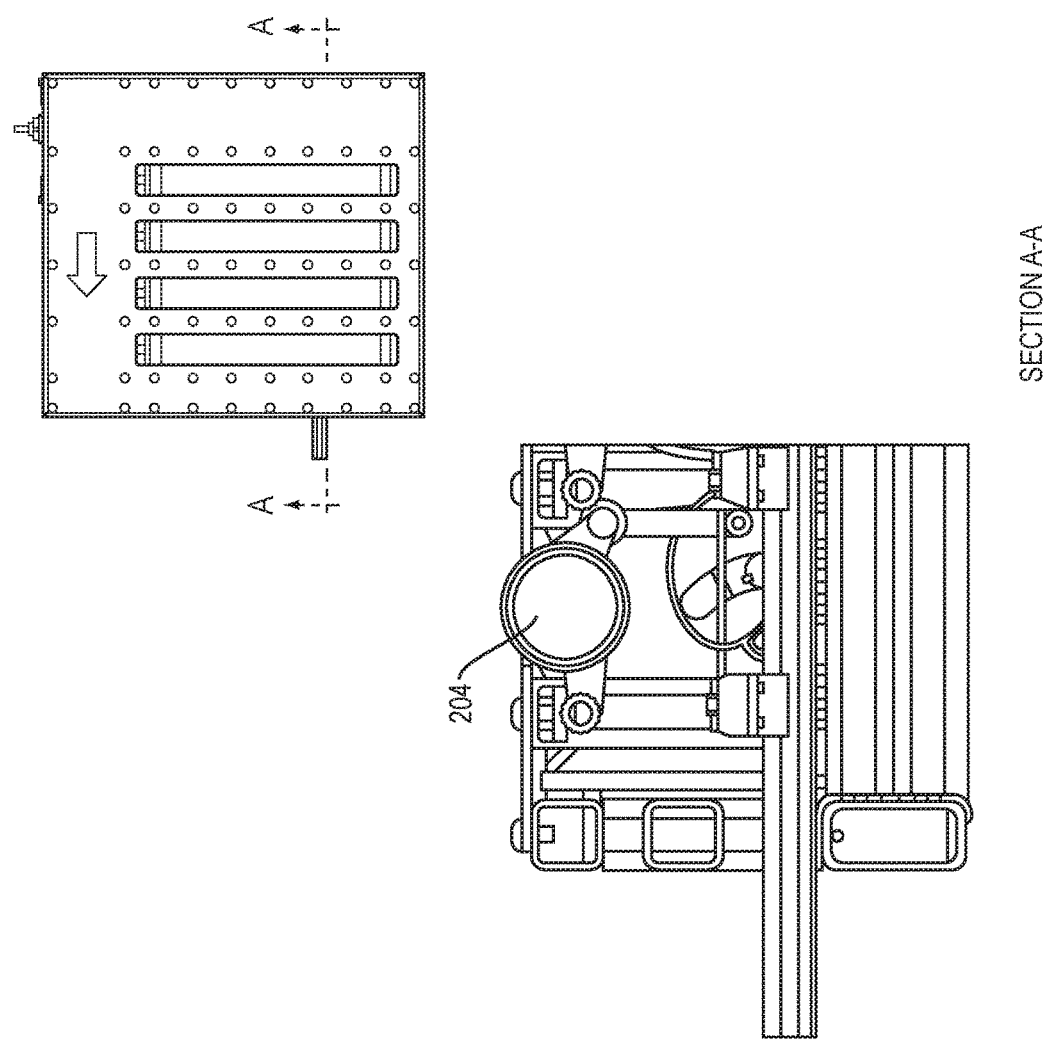

SECTION A-A

SYSTEMS AND METHODS FOR CAPTURING KINETIC ENERGY AND FOR EMISSION-FREE CONVERSION OF CAPTURED ENERGY TO ELECTRICITY

CROSS-REFERENCE TO RELATED APPLICATIONS

This application claims priority to and the benefit of U.S. Provisional Patent Application No. 62/636,409, entitled "Systems and Methods for Capturing Kinetic Energy and for Emission-Free Conversion of Captured Energy to Electricity," which was filed on Feb. 28, 2018, which is incorporated herein by reference in its entirety.

FIELD OF THE INVENTION

This disclosure generally relates to techniques for generation of electricity and, in particular, to techniques for capture of energy from the movement of an object and to generation of electricity from the captured energy.

BACKGROUND

Every day, millions of vehicles are forced to slow while traveling, e.g., when the roads narrow and/or lanes merge, when the vehicles approach boarder security/inspection check points, entrances to parks, draw bridges, etc. The use of rumble strips or speed bumps at such places to slow down the vehicles is well known. It is also known that a speed bump and a system coupled thereto can be configured to generate electricity as vehicles pass over the speed bump. In general, two factors must be considered in configuring a speed bump in this manner, i.e., to generate electricity. First, vehicle and passenger safety (and also comfort) are important. The impact between the moving vehicle and the speed bump should not create so much force as to cause injury and/or significant discomfort to the passengers and/or damage to the vehicles. The impact should also not cause the vehicle to skid off the road. This requirement generally constrains the shape, size, materials, and/or maximum height of the speed bump from the road surface.

The other factor is capturing the energy associated with the impact of the moving vehicle on the rumble strip or speed bump. This impact or the force imparted by the moving vehicle to the speed bump generally includes a component associated with the motion of the vehicle along the surface of the road and another component associated with the weight of the vehicle. Many speed bumps are generally configured to capture the potential energy associated with the weight of the vehicle. Typically, the speed bump and/or a component linked thereto moves down in a vertical direction due to the weight of the vehicle as the vehicle is positioned over the speed bump. The downward movement of the speed bump is typically translated into the motion of an armature within a magnetic field, which can produce electricity.

SUMMARY OF THE INVENTION

Various embodiments described herein feature techniques for capturing not only the potential energy associated with the weight of the vehicle but also the kinetic energy associated with the motion of the vehicle. To this end, a number of (e.g., 2, 3, 4, etc.) rollers or bars are arranged in a series, where the bars are parallel to each other, and where each bar is configured to move along a respective arc during or upon impact by a moving vehicle. The bar may continue to move after the tire is no longer in contact with the bar, i.e., not impacting the bar. The arcuate movement of each bar can facilitate capture of at least a part of the slowing vehicle's kinetic energy imparted to the bar upon the impact; in addition to facilitating capture the vehicle's potential energy.

The energy corresponding to the arcuate movement of each bar is stored in one or more torsional or spiral springs that are mechanically coupled to one or more bars. A compression spring coupled to each respective bar can store the energy associated with the movement of the corresponding bar, but summing or consolidating such stored energy can be cumbersome. For example, during the consolidation phase, the release of the stored energy would have to be timed and synchronized carefully so that the release of stored energy from each compression spring would result in a generally continuous, uninterrupted release of energy. If such synchronization is not achieved and/or is not maintained over the course of operation of the system, significant (e.g., more than 10%, 20%, 50%, etc.) of the stored energy may be lost during consolidation. The energy loss during the consolidation phase can significantly decrease the system efficiency because typically much less than 100% (e.g., 7%, 10%, 15%, etc.) of the total energy associated with the impact with each individual bar is captured for storage thereof and, a portion of this fraction is further lost during consolidation. The torsional spring, however, may generally be coupled to two or more bars or even to all bars. Because the torsional spring needs to be wound as opposed to be compressed in a selected direction, assemblies coupled to different bars can continually wind the torsion spring and, as such, the torsion spring can store the energy associated with the movement of the different bars in a cumulative manner. Thus, the energy captured from each bar is summed up or accumulated at the time of storage and, as such, no further synchronization is needed during release of the energy. In this way, the torsional spring assembly can enhance the efficiency of capturing the kinetic and potential energies generated from the successive impacts with several bars.

After a preselected degree of winding of the torsional spring is achieved, the spring is allowed to unwind, releasing the energy stored in the torsional spring. The released energy is used to rotate an armature within a magnetic field, which can produce electricity. The generated electricity can be consumed immediately and/or may be stored in a battery for later use or metered into the grid.

Accordingly, in one aspect, a system is provided for capturing at least a part of kinetic energy (KE) of a moving vehicle upon impact thereof with one or more arc rollers. The system includes a first arc roller movable along a first arcuate path upon impact by the moving vehicle and a first linkage linking the first arc roller to a first rotatable component. The system also includes a primary torsional spring coupled to the first rotatable component. The primary torsional spring is configured to wind upon at least a partial rotation of the first rotatable component by an arcuate movement of the first arc roller, until the first rotatable component reaches a first preset position. In addition, the system includes a first return mechanism to return the first arc roller to an initial position thereof when the first rotatable component reaches the first preset position. In some embodiments, the first rotational component includes an adjustable cam that determines the first preset position. In various embodiments, the system may also include an electrical generator coupled to the primary torsional spring.

In some embodiments, the system further includes a second arc roller movable along a second arcuate path upon impact by the moving vehicle and a second linkage linking the second arc roller to a second rotatable component. In addition, the system may include a second return mechanism to return the second arc roller to an initial position thereof when the second rotatable component reaches a second preset position. The primary torsional spring may be coupled to the second rotatable component and may be configured to wind further upon rotation of the second rotatable component by a forward movement of the second arc roller.

The second arc roller may be associated with an adjustable component adapted to adjust an angular range of the second arc roller. The adjustable component may be coupled to the first linkage, so that the angular range of the second arc roller can be selected based on the movement of the first arc roller. For example, if a heavy vehicle is passing and/or a vehicle is passing at a high speed, relatively more potential and/or kinetic energy may be received by the first arc roller, which may move more than it would have if a lighter vehicle or a vehicle moving at a slow speed were passing. Thus, the movement of the first arc roller can represent the amount of potential and kinetic energy available, and the movement of the second arc roller can be adjusted to capture the available energy. In general, a greater amount of energy may be captured if the second arc roller (and any other subsequent arc rollers) are allowed to move along a longer path.

The diameter of first arc roller may be selected from the range 3 to 7 inches. The system may include between one and seven arc rollers that disposed in a series and in parallel to one another. The first arc roller may be attached to a pivot point and may be oriented at a first impact pivot angle. The first impact pivot angle may be adjustable through a ladder mechanism upon which the pivot point is mounted.

In some embodiments, the first arc roller is connected by a joint to the first rotatable component, wherein a second angle between a first plane passing through the joint and a central axis of the first arc roller and a second plane defining the road surface represents redirected impact energy. A third angle between an initial position of the first rotatable component and a vertical reference plane represents an outside stroke due to angular impact. The third angle may be adjustable through movement of a link between the first arc roller and the first rotatable component. A fourth angle is an angle of rotation of the first rotatable component due to impact and can be varied or selected based on the first angle and the second angle.

If the expected traffic would include heavy vehicles and/or fast-moving vehicles, a greater impact energy may be expected and the first, second, third, and/or the fourth angles may be adjusted accordingly. For example, lager first and/or fourth angles and/or smaller second and/or third angle may be used. On the other hand, if the expected traffic includes light and/or slowly moving vehicles, smaller first and/or third angles and/or larger second and/or third angles may be used.

The primary torsional spring may include a clutch operated by a rotation of the primary torsional spring, wherein the clutch disengages to drive an alternator when the primary torsional spring reaches a predetermined rotational threshold and unwinds when the clutch disengages. In some embodiments, the system includes a third arc roller movable along a third arcuate path upon impact by the moving vehicle, and a third linkage linking the third arc roller to a third rotatable component. The system may also include a third return mechanism to return the third arc roller to an initial position thereof when the third rotatable component reaches a third preset position. In addition, the system may include a secondary torsional spring coupled to the third rotatable component, where the secondary torsional spring is configured to wind upon at least a partial rotation of the third rotatable component by an arcuate movement of the third arc roller. An alternator may be coupled to both the primary and secondary torsional springs.

In another aspect, a method is provided for assembling a system for capturing at least a part of kinetic energy (KE) of a moving vehicle upon impact thereof with at least one arc roller. The method includes mounting a first arc roller on a frame, where the first arc roller is movable along a first arcuate path upon impact by the moving vehicle. The method also includes coupling a first linkage linking the first arc roller to a first rotatable component, and coupling a primary torsional spring to the first rotatable component, wherein the primary torsional spring is configured to wind upon at least a partial rotation of the first rotatable component by an arcuate movement of the first arc roller. In addition, the method includes coupling a first return mechanism to the first arc roller to return the first arc roller to an initial position thereof when the first rotatable component reaches a first preset position.

In some embodiments, the method includes mounting on the frame a second arc roller that is movable along a second arcuate path upon impact by the moving vehicle and coupling a second linkage linking the second arc roller to a second rotatable component. The method may also include coupling the second rotatable component to the primary torsional spring and coupling a second return mechanism to return the second arc roller to an initial position thereof when the second rotatable component reaches a second preset position. The primary torsional spring may be configured to wind further upon rotation of the second rotatable component by a forward movement of the second arc roller.

In some embodiments, the method includes linking the second arc roller to an adjustable component adapted to adjust an angular range of the second arc roller. The method may further include coupling the adjustable component to the first linkage, whereby a movement of the first arc roller adjusts the angular range of the second arc roller. An adjustable cam may be provided with the first rotational component to determine the first preset position. The method may also include coupling an electrical generator with the primary torsional spring. The first arc roller may have a diameter between 3 and 7 inches, and the method may include providing between four and seven arc rollers disposed parallel to one another.

In some embodiments, the method includes attaching the first arc roller to a pivot point, and orienting the first arc roller at a first impact pivot angle. The method may also include mounting the pivot point on a ladder mechanism, so that the first impact pivot angle is adjustable. In some embodiments, the method includes connecting the first arc roller to the first rotatable component via a joint, wherein a second angle between a first plane passing through the joint and a central axis of the first arc roller and a second plane defining the road surface represents redirected impact energy. A third angle between the first rotatable component and a vertical reference plane may represent an outside stroke due to angular impact, and the method may include providing an adjustable link between the first arc roller and the first rotatable component, so as to adjust the third angle. A fourth angle can be an angle of rotation of the first rotatable component due to impact and the method may include selecting a maximum limit of the fourth angle based on the first angle and the second angle.

In some embodiments, the method includes mounting on the frame a third arc roller movable along a third arcuate path upon impact by the moving vehicle, and coupling a third linkage linking the third arc roller to a third rotatable component. The method may also include coupling a third return mechanism to return the third arc roller to an initial position thereof when the third rotatable component reaches a third preset position. Moreover, the method may include coupling a secondary torsional spring to the third rotatable component, where the secondary torsional spring is configured to wind upon at least a partial rotation of the third rotatable component by an arcuate movement of the third arc roller. The method may also include coupling an alternator to both the primary and secondary torsional springs.

The method may include providing a clutch with the primary torsional spring, where the clutch is operated by a rotation of the primary torsional spring and disengages to drive an alternator when the primary torsional spring reaches a predetermined rotational threshold and unwinds when the clutch disengages.

BRIEF DESCRIPTION OF DRAWINGS

In order to facilitate a fuller understanding of the present invention, reference is now made to the accompanying figures. These figures should not be construed as limiting the present invention, but are intended to be exemplary only.

FIG. 2C is a sectional view of the energy capture system in accordance with an embodiment of the invention.

DESCRIPTION

Figure 1A:
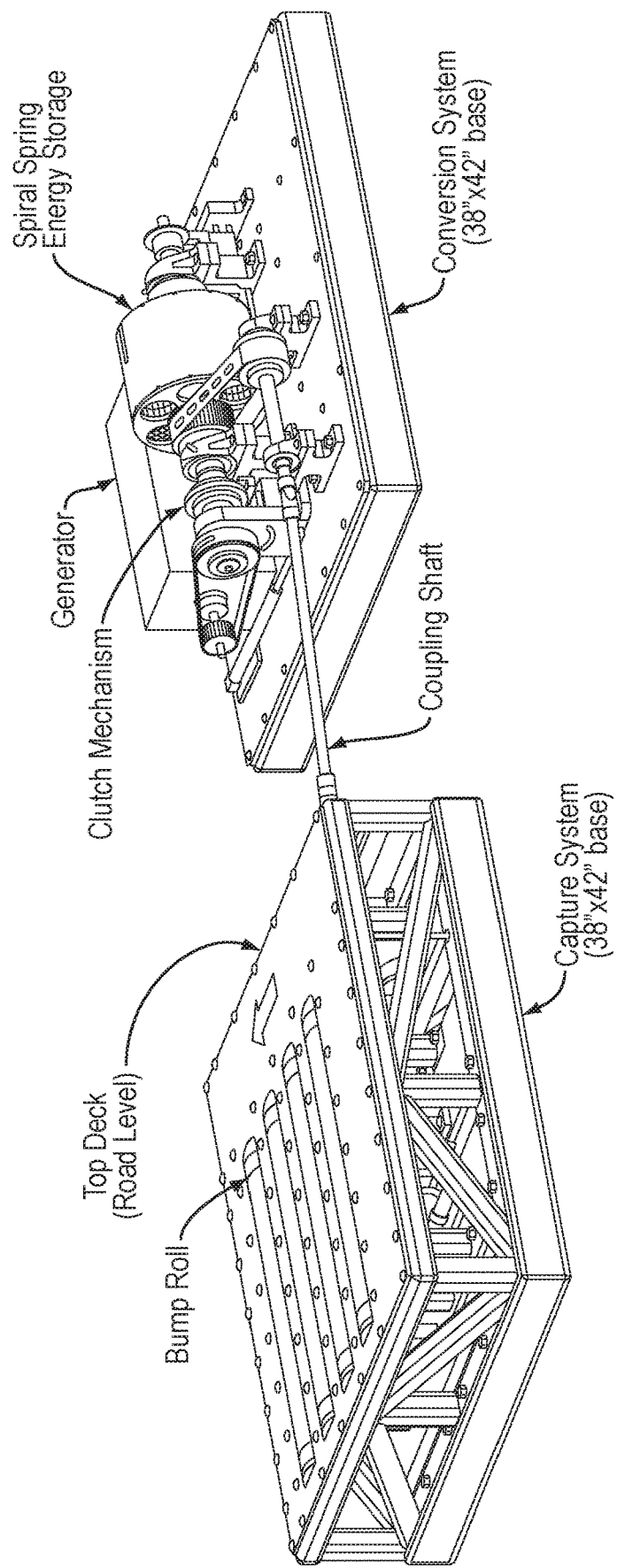
FIG. 1A is an isometric view of an energy capture and conversion system in accord accordance with an embodiment of the invention.

FIG. 1A is an isometric view of an energy capture and conversion system in accordance with an embodiment of the invention. FIG. 1A depicts a kinetic energy (KE) and potential energy (PE) capture and conversion system that includes a KE-PE capture system coupled to an energy conversion system, according to one embodiment. FIG. 1A illustrates a side-by-side embodiment, in which the capture system is shown as coupled to the conversion system by a shaft in a side-by side configuration.

Figure 1B:
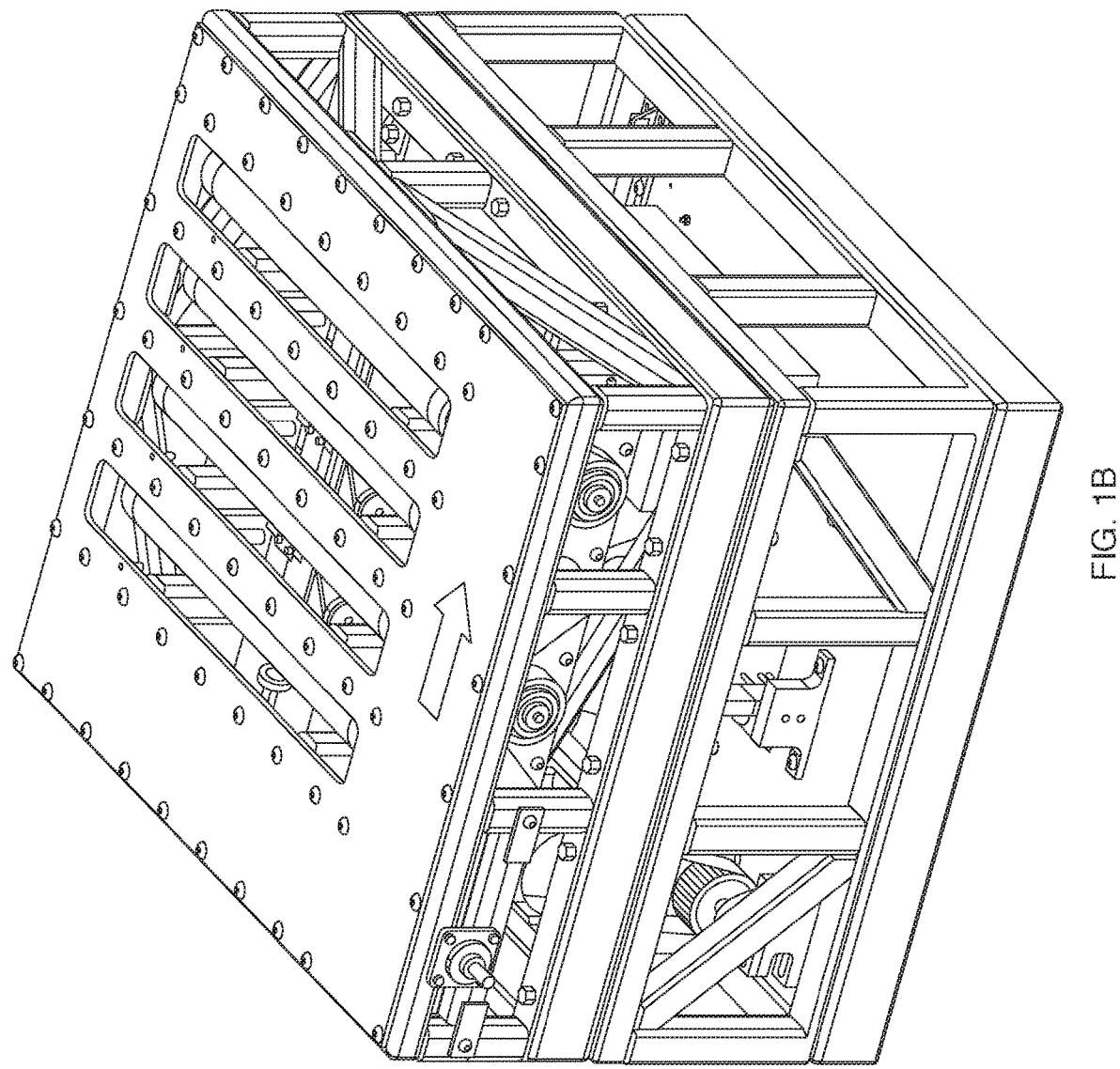
FIG. 1B is an isometric view of an energy capture and conversion system in accordance with an additional embodiment of the invention.
Figure 1C:
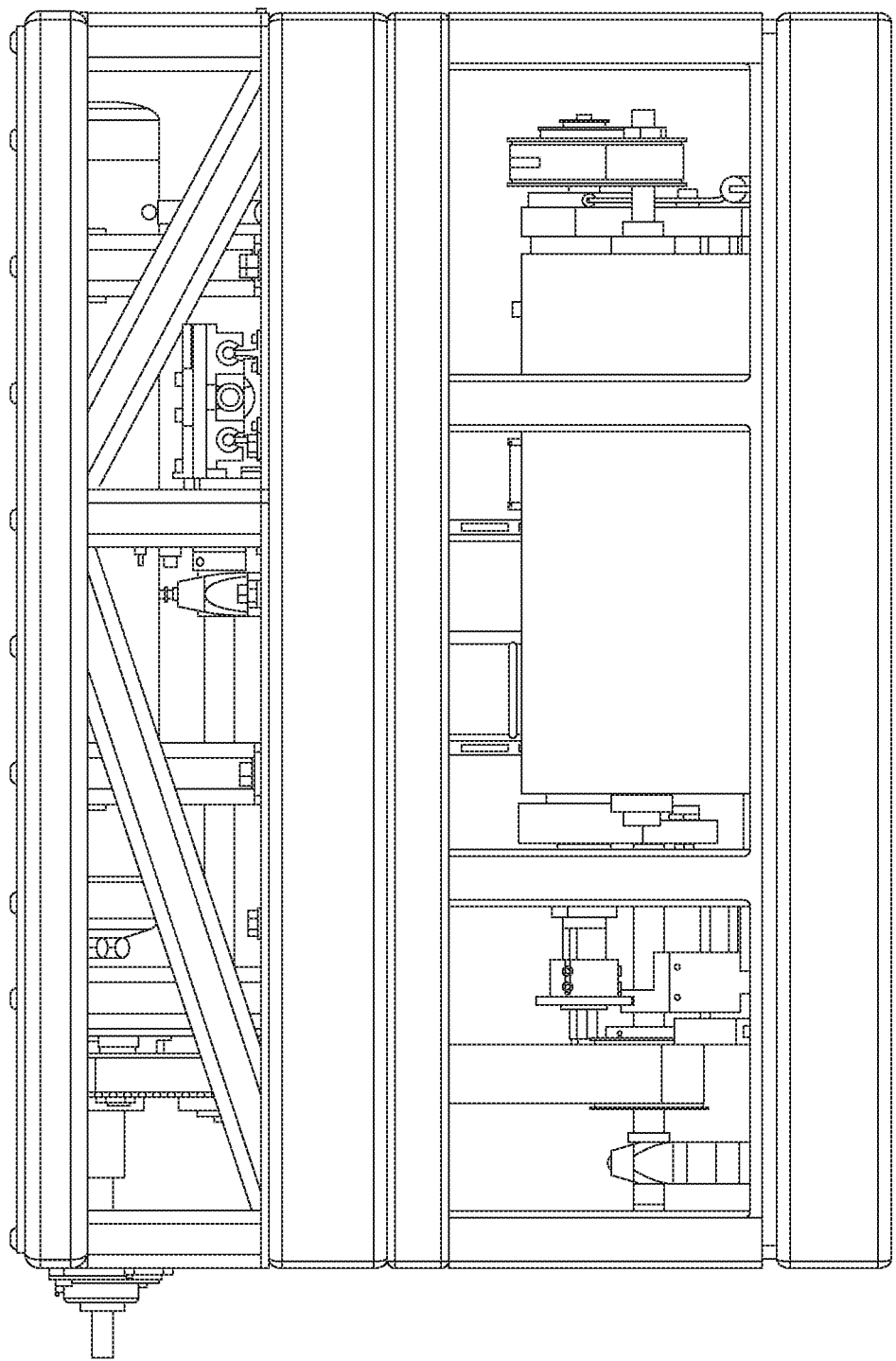
FIG. 1C is an elevation of the embodiment shown in FIG. 1B.

FIG. 1B is an isometric view of an alternative embodiment of the energy capture and conversion system in a stacked configuration. In the displayed embodiment, the capture system is stacked to rest on the conversion system and the entire assembly can be installed in a modular fashion in the roadway or impact surface. FIG. 1C illustrates a plan view of the stacked modular capture and conversion assembly. In embodiments of the invention, multiple stacks of capture and conversion assemblies can be provided. Further, multiple capture and multiple conversion assemblies can be provided in a single stack and planetary gear sets may provide torque increases and transfer.

The side-by-side embodiment of the capture and conversion system shown in FIG. 1A has particular applicability in temporary event applications as its limited depth allows it to be easily installed to integrate with a ramp or other temporarily installed surfaces. Such temporary event applications may include, for example, sporting events, conventions, concerts, construction sites, or other events. In contrast, the stacked configuration creates a smaller road surface footprint and is therefore more suited to permanent applications, such as, for example, parking garages, ports, airports, and streets. Retraction mechanisms can be provided upon installation of the systems, so that the entire system is retractable into the roadway. Thus, the retractable mechanism may be coupled to a sensor assembly and/or timer for operating based on time of day, time interval, weight, speed, frequency, etc. The retractable mechanism may be computer controlled so that it can be retracted during specific hours or traffic conditions or weather events. With respect to traffic conditions, local officials may aim to provide unhindered speed to travelers during off-peak conditions and the system can be retracted during this time. The retractable mechanism may be further utilized in regions requiring snow and ice removal as snow and ice buildup could potentially hinder functionality of the system. Accordingly, the system can be retracted in order to accommodate plows or other snow and ice removal equipment. The retractable mechanism should be capable of retracting and raising the entire assembly or specific arc rollers independently, whether stacked or side-by-side and may include a system of linked pivotal connecters.

Figure 2A:
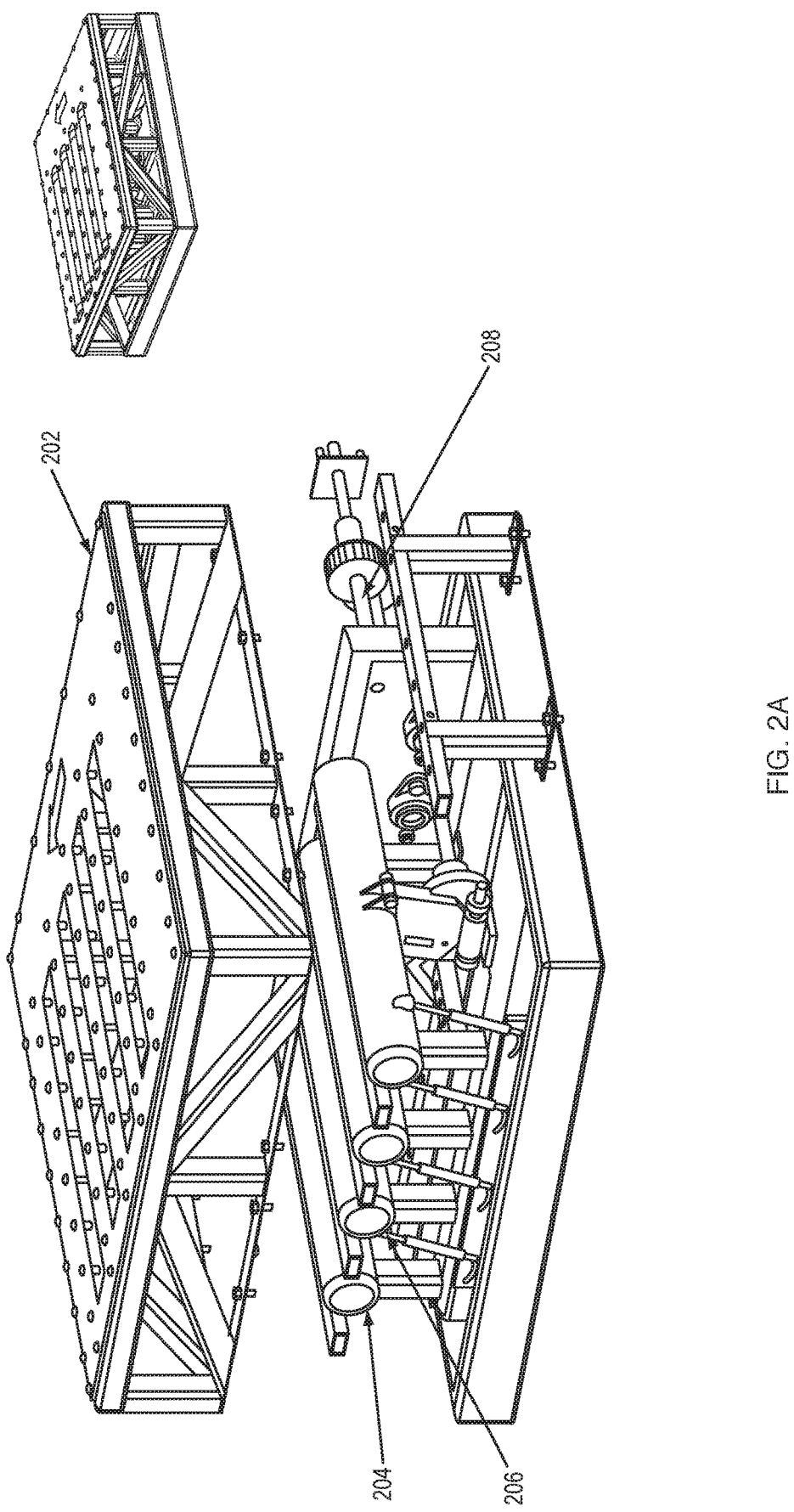
FIG. 2A is an exploded view of an energy capture system in accordance with an embodiment of the invention.
Figure 2B:
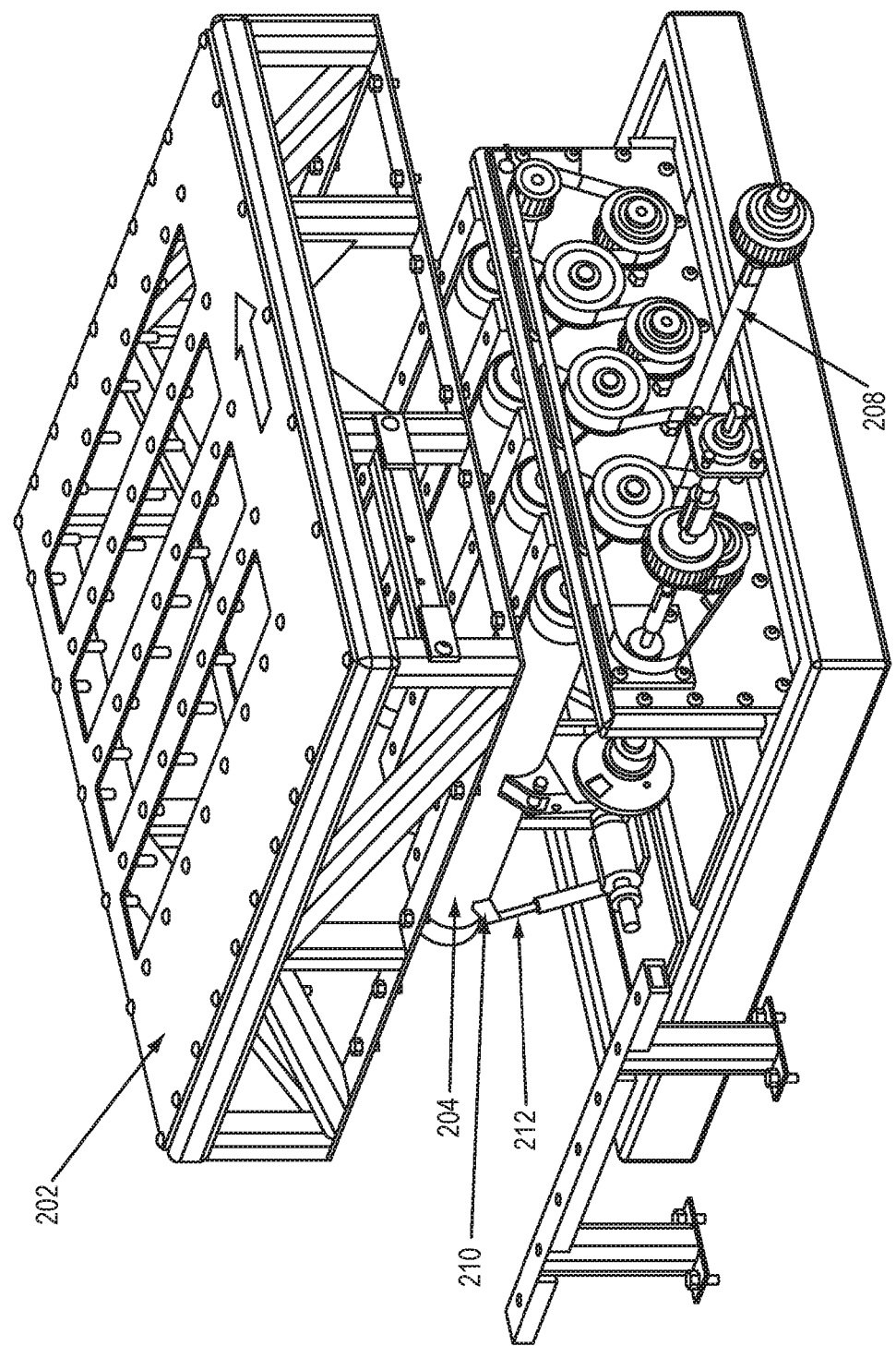
FIG. 2B is a further exploded view of an energy capture system in accordance with an embodiment of the invention.

FIG. 2A is an exploded view of an energy capture system in accordance with an embodiment of the invention. FIG. 2B is a further exploded view of an energy capture system in accordance with an embodiment of the invention. FIG. 2C is a sectional view of the energy capture system in accordance with an embodiment of the invention.

FIGS. 2A-2C depict various views and a listing of components of a KE-PE capture system, according to one embodiment. In particular, FIG. 2A illustrates a top frame 202, having sufficient structural integrity to withstand impact produced by passing vehicles. The frame is mounted on multiple vertical struts and diagonals. Both the frame and its connected struts and diagonals are preferably constructed of steel and other suitable materials. The diagonals may be configured at different angles with respect to the top surface. The angles may vary, for example, between 15 and 30 degrees. A top surface of the frame may be encircled, for example, 2 inch, by 2 inch steel tubing. Cap screws may be utilized on a top surface of the top frame. A base portion of the frame that supports the arc rollers (also called bump rollers) may also be constructed of steel and embodiments of the base may include two inch by four inch steel tubing. The base portion of the frame may be attached to support columns allowing connection to the top surface of the frame. Cross bracing and other structural features may utilize sheet steel, aluminum or HDPE sheets in order to achieve structural requirements and minimize overall system weight.

FIG. 2A further depicts four arc rollers or bars 204, where each bar can capture at least a part of a vehicle's KE and PE, and associated linkage 206 to transfer the KE and PE to the other components of the system. The arc rollers may be configured to move in succession and in embodiments of the invention may be connected to an output shaft 208 or other output mechanism. Each arc roller operates to separately capture energy. In embodiments of the invention, the arc rollers may be constructed of steel pipes or similarly durable materials for form and function, such as, for example, three inch diameter steel pipes. The arc rollers may alternatively include larger or smaller diameter pipes or may be formed in rectangular, square, oval, or other cross-sectional shapes. However, circular cross sections are preferred for most applications as they result in noise reduction and reduce impact to tires.

FIG. 2B depicts components of a linkage subsystem according to one embodiment that is included in the KE-PE capture system depicted in FIG. 2A. This embodiment of the linkage subsystem includes pulleys connected between the arc rollers and a drive shaft 208 that connects to the energy conversion system. In this embodiments, the energy conversion system also includes at least a part of the energy storage system, which includes a torsional spring, as further discussed below. While one embodiment may utilize a shaft as shown, other embodiments, such as the stacked embodiment of FIG. 1B may utilize a belt, chain, or gearing configuration to connect to the conversion system. FIG. 2B further illustrates gas spring gussets 210 connected to an arc roller on one end and to a return mechanism 212 on the other. The return mechanism is adjustable and may be set based on the expected speed and the expected weight of the vehicles. For example, a stronger return spring is needed for heavy commercial truck applications but is not necessary for lighter passenger vehicle traffic. The return mechanism can be a coil spring or a hydraulic shock. A respective return mechanism is associated with each arc roller, the different types of return mechanisms may be coupled to different rollers. The PSI ratings of the return mechanisms range from 10 lbs. to 140 lbs. Subranges within this range, e.g., 10-50 lbs., 20-60 lbs., 80-120 lbs., 20-80 lbs., are also contemplated. Further, the system may be configurable in order to change the rate of energy collection through changing of gear ratios. In embodiments of the invention, the system allows automatic shifting of gears in order to provide a customized transmission. Automatic shifting may be achieved, for example, through operation of an attached controller, which uses internal stored battery power to operate a gearbox and associated components. The gearbox may utilize the main shaft, lay shaft, and a dog clutch installed on the shaft or within compound drives to engage a higher or lower gear ratio, and maximize energy capture and harvesting. In this instance, a goal of the system is to increase the flow of energy output by optimizing the alternator RPM range and controlling and storing the variable energy inputs to the alternators to maintain the output in high traffic volume. Alternatively, the system can store energy that is released in bursts.

FIG. 2C depicts a cross-section of the rollers and the respective linkage associated with each roller. In some embodiments, the respective linkages associated with different rollers of groups of rollers can be of different types. In some embodiments, the linkages associated with all rollers are of the same kind. In the displayed embodiment the arc rollers are connected to tie rod or arm linkage to a cam. In some embodiments, each arc roller is connected via a respective tie rod/arm linkage to a respective cam that ultimately rotates a coupling shaft that winds the torsional spring. In a typical application, a vehicle moves from right to left. However, in embodiments of the invention, the system is operable to allow vehicle traffic in any direction and at any angle, which significantly enhances the safety of the system. The rounded shape of the arc rollers helps to ensure that damage to vehicles and/or the capture and conversion system is avoided regardless of the angle of impact. Thus, if a vehicle is out of control or backs up over the assembly, the assembly will not cause damage to the vehicle or its passengers. Further, the system is configured to capture energy regardless of the approach direction, though the amount of energy captured may vary depending on direction. The impact on the arc roller causes the arc roller to move in an arc, push down the tie rod, and rotate the cam about its center. The center may be located in a slot and therefore enables the cam to move up and down, which would adjust the angle of rotation of the cam. The length of the slot can be 0.5 inches, 1 inch, 1.5 inches, etc. The system may include one or more skid resistant coating(s), acid etching, or unique material properties including coatings, membranes, and sealants.

Although FIGS. 2A-2C depict four rollers, this is illustrative only. Fewer than four, e.g., 1 or 2 and more than four, e.g., 5, 6, 7 etc. rollers are contemplated in different embodiments. Further, while the rollers appear to be evenly spaced, the configuration of rollers may be customized for particular applications. In some applications, providing a widened gap between one or bump more rollers may be desirable as this configuration may provide additional stability and avoid wheel propagation at high speeds. Additionally, one or more arc rollers may provide variable transmission testing, using varying energy collection and transfer methods.

In some embodiments, as shown in FIGS. 2A-2C, strike/bump energy is transferred to a shaft bump roll pivot through a hinge and drive gusset, with a spring/shock return gusset for bump roll stop/return action. Structural pivot support and columns, bearing plates, and internal frame/housing structure can provide additional load capabilities for the components and assemblies, such as link arm assemblies and slot cam, for energy transfer. The energy transfer assemblies can be connected, collected, and synchronized by a track follower, guide/block/pivot/slide assemblies and adjustments, and/or lock rings. Energy may also be transferred via idler assemblies (e.g., belt, tension mechanisms), and a pulley (e.g., drive and idler pulleys), and/or belt and gear assemblies, into shaft assemblies (e.g., drive, stepped output idler, etc.), out into the conversion subsystem.

The housing or support frame weldment of the system illustrated with reference to FIGS. 1A-2C can be a steel, aluminum, alloy, or a polymer framed box structure with a steel, aluminum, alloy, polymer covering or sheathing, which is further sealed from contaminants using various materials including various polymer combinations, rubber, adhesives and specialty coatings. The bump roll assembly generally receives the vehicle tire impact, which according to one embodiment is one tire striking one module unit having four arc rollers. Two modules placed adjacent to one another within the roadway generally cover one typical road lane width, maximizing kinetic and potential energy capture by condensing each system to harvest energy from each wheel strike or pass. As illustrated, the stacked configuration shown in FIGS. 1B and 1C would have a further reduced footprint.

Figure 3A:
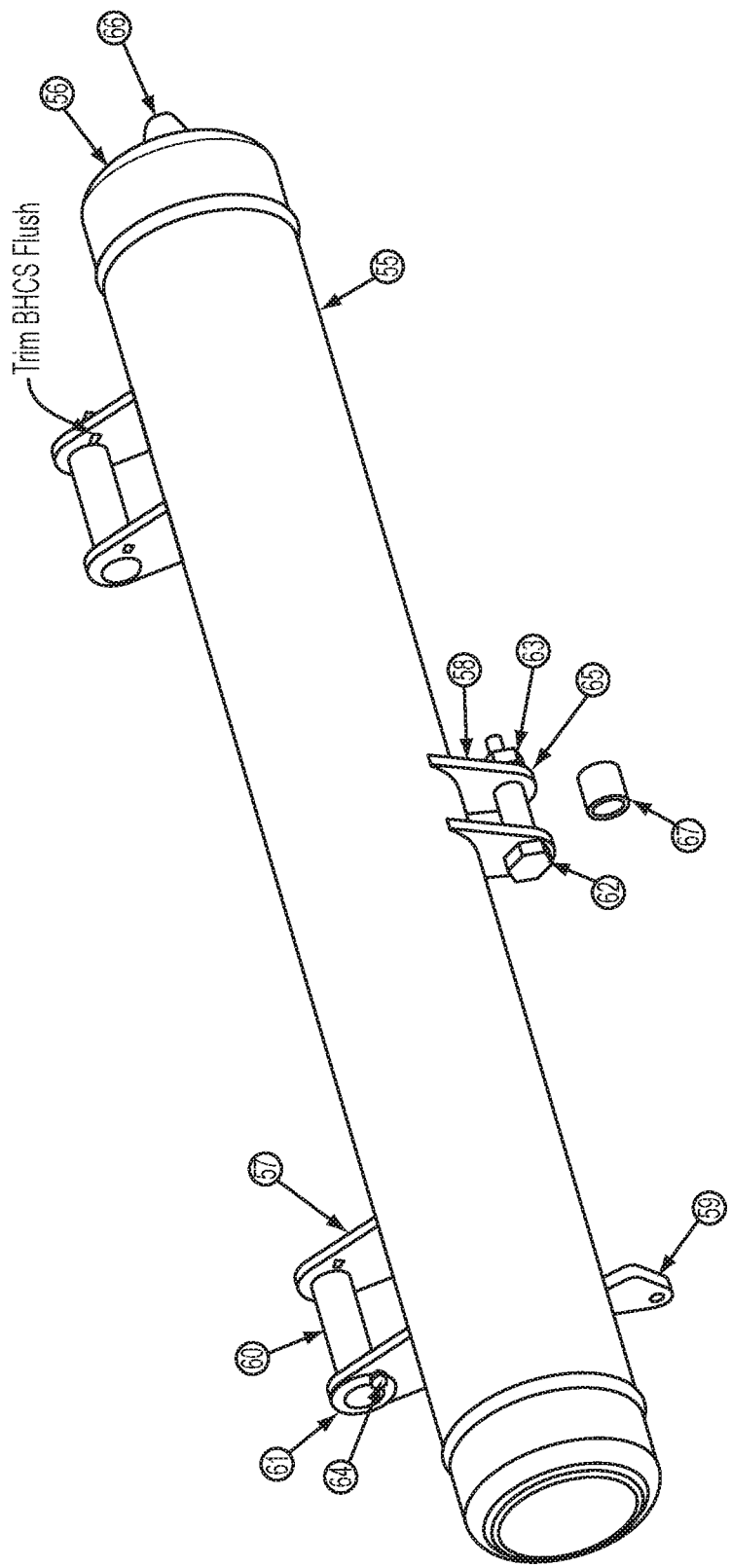
FIG. 3A is an isometric view of an arc roller of the energy capture system in accordance with an embodiment of the invention.

FIG. 3A depicts a bump roll assembly, which includes a roller configured to be displaced along an arc. Upon impact by a moving vehicle, the roller does not merely move vertically downwards. Instead, upon impact with the wheel/tire of a moving vehicle, the roller moves along an arc, thereby efficiently absorbing at least part of the kinetic energy of the moving vehicle. The arc roller may include an arc roller strike tube 55 with attached pairs of hinge gussets 57 toward both ends of the strike tube. A shaft-bump roll pivot 60 may be attached to the hinge gussets. A cap screw 64 and a steel shim 61 may be utilized to complete the assembly. A gas spring gusset 59 or equivalent device may also be attached to the arc roller strike tube 55. Further, a pair of drive gussets 58 may be located substantially centrally along the length of the arc roller strike tube 55 and is shown with a shoulder bolt connection 62 secured by a flanged nut 63 and washer 65. A spacer 67 may also be utilized. A pipe cap 56 and spacer 66 may be located at an end of the strike tube 55. In preferred embodiments, these arc roller components are made from steel or other materials suited to the intended purpose and may be weighted to increase captured forces.

Figure 3B:
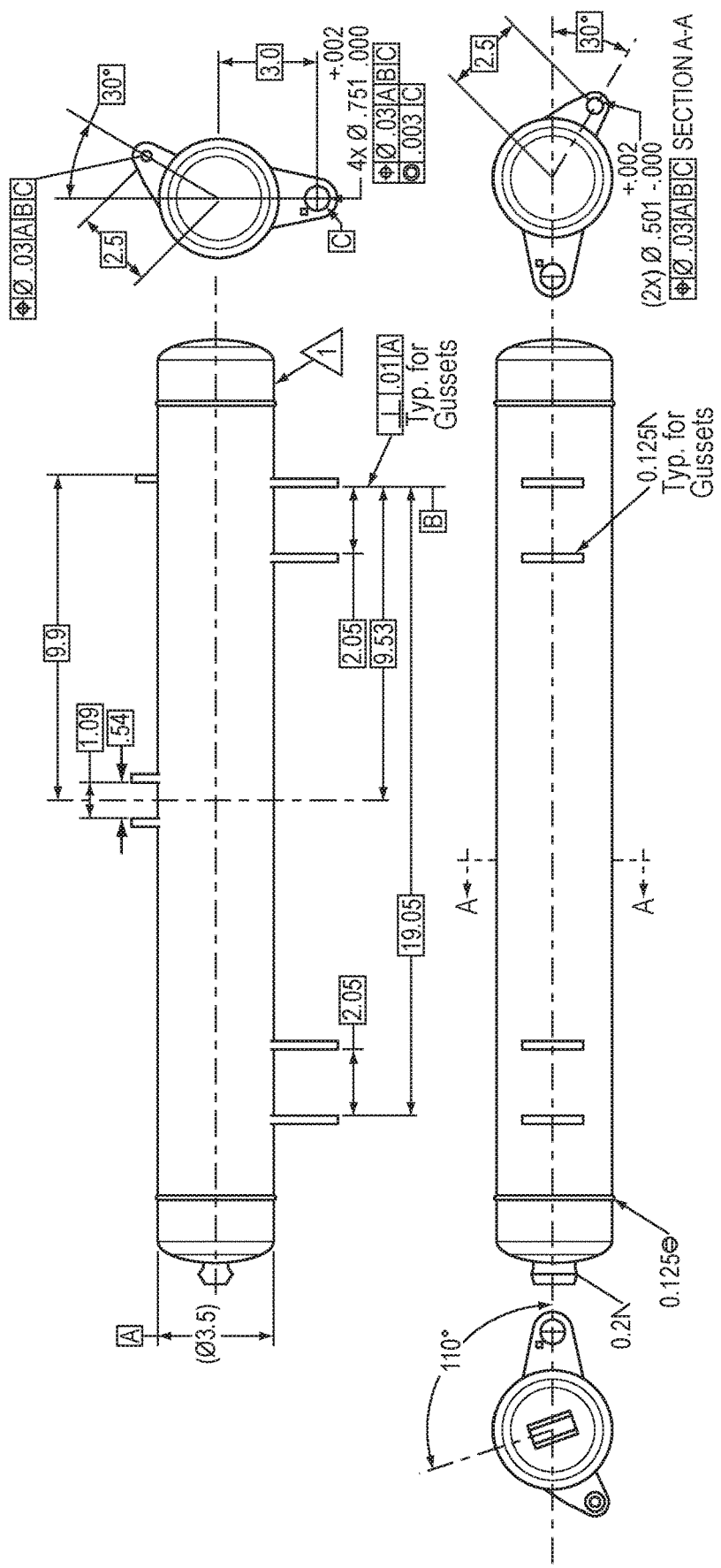
FIG. 3B includes a sectional view of the arc roller of the energy capture system in accordance with an embodiment of the invention.
Figure 3C:
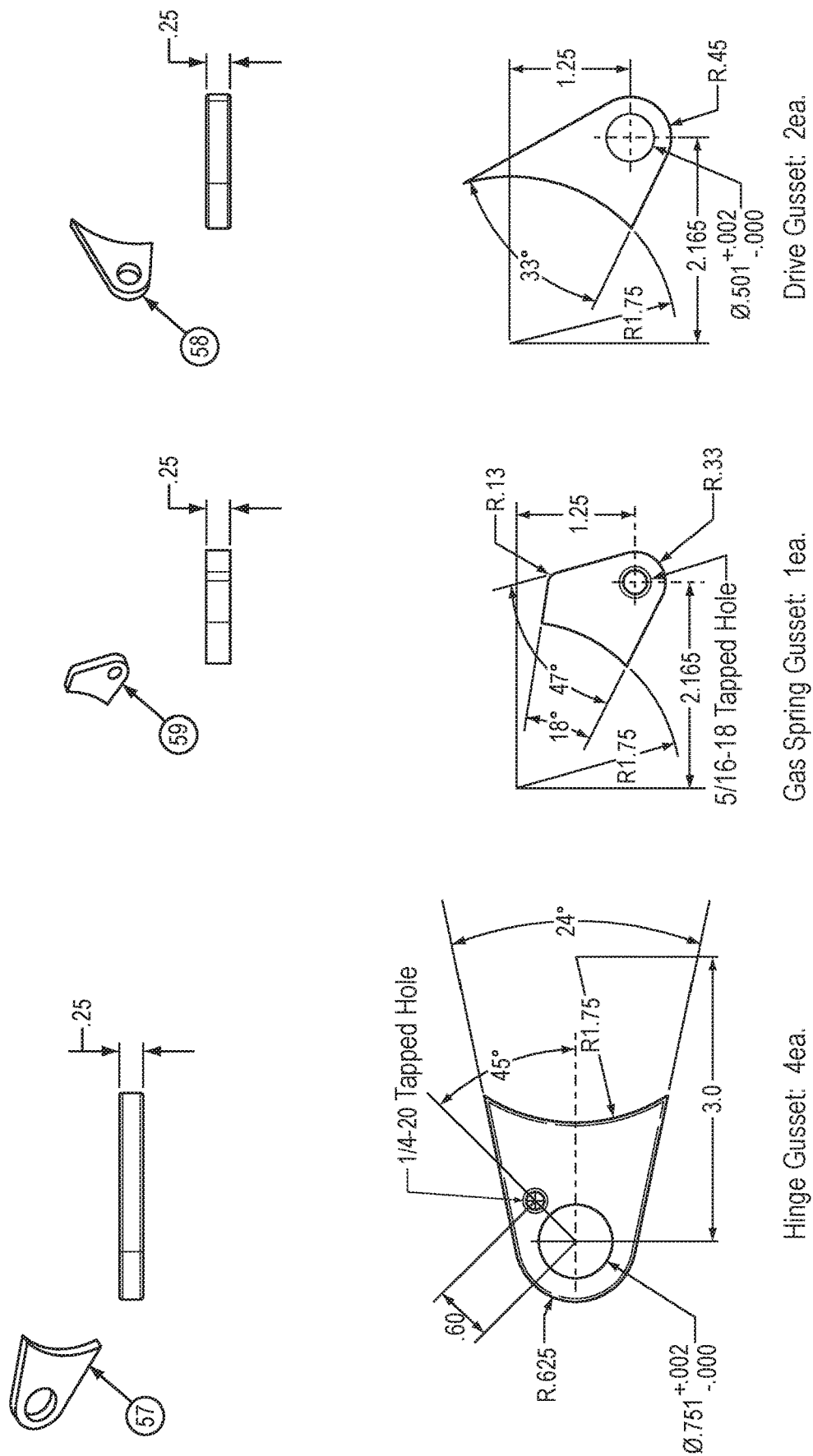
FIG. 3C includes isometric views of components of the arc roller of the energy capture system shown in FIG. 3A.
Figure 3D:
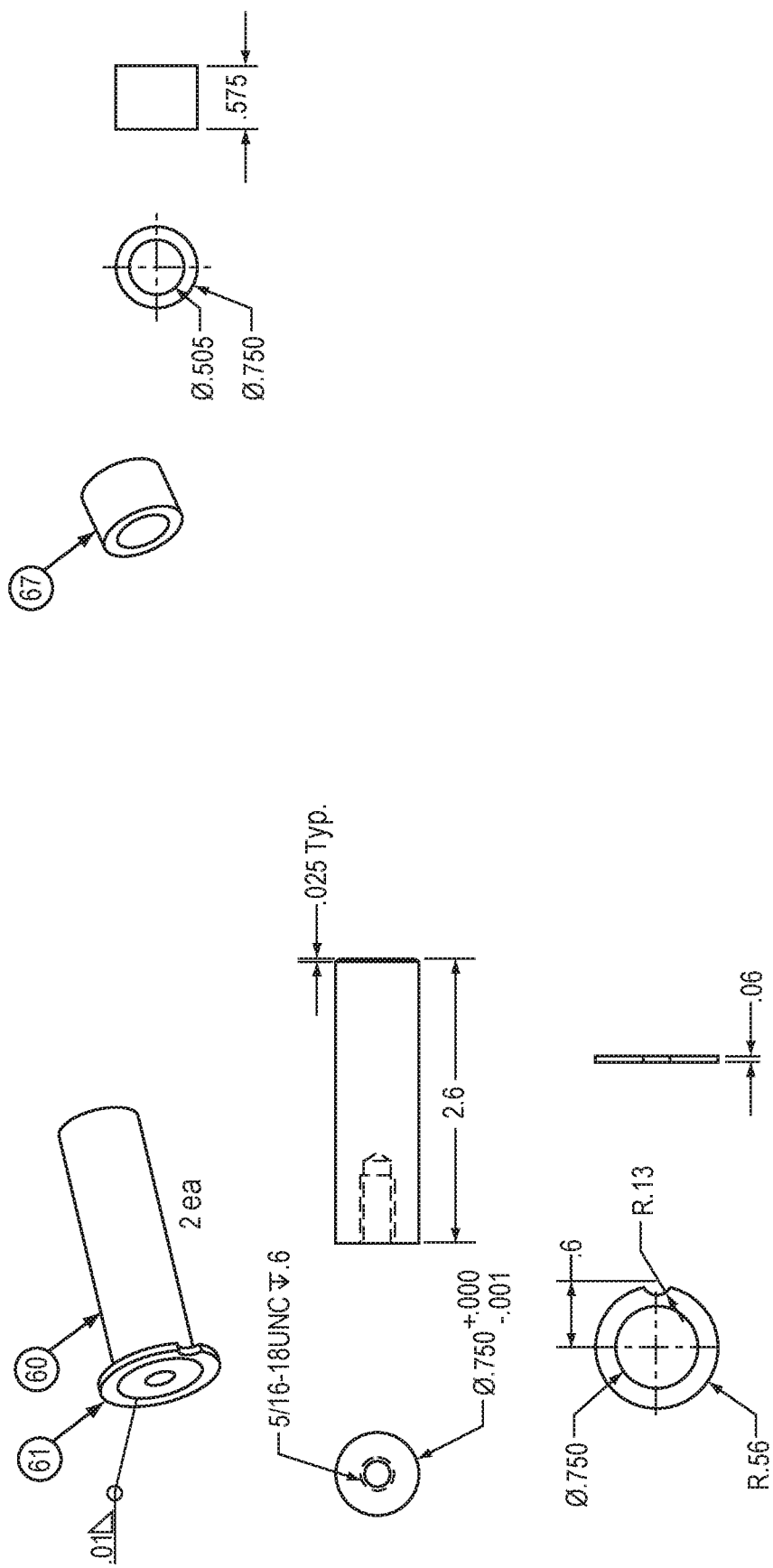
FIG. 3D includes isometric views of components of the arc roller of FIG. 3A in accordance with embodiments of the invention.
Figure 3E:
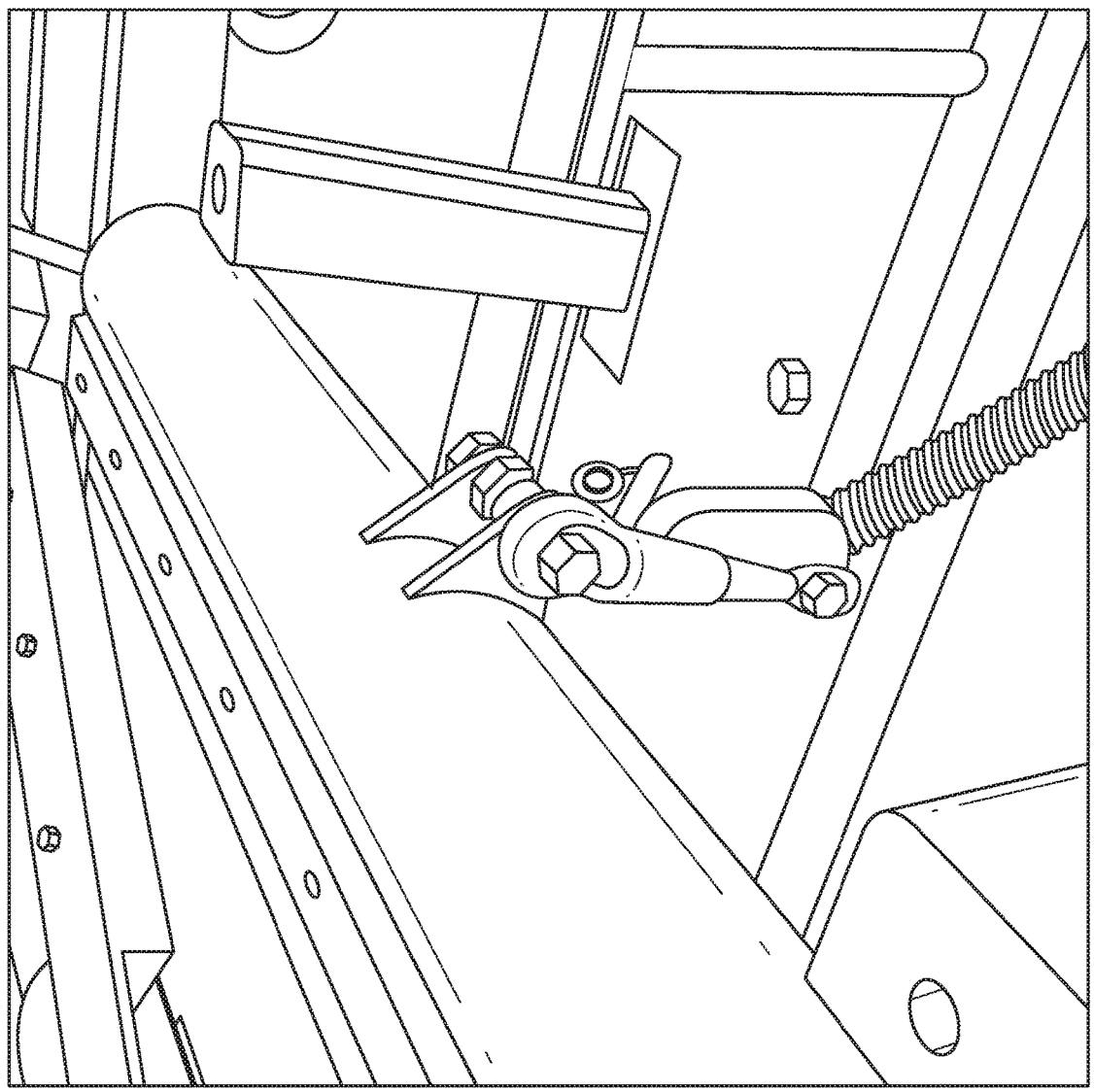
FIG. 3E depicts an arc roller in accordance with an embodiment of the invention.

FIGS. 3B-3E depict and illustrate the operation of hinges that allow the roller to move along an arc. As will be further explained, the arcs for the rollers may be similar or they may differ. For example, each arc may have the same radius of curvature but the arc length may differ. Alternatively, the arc associated with each roller may have a different radius of curvature. These figures show the angular pivot attachment of the arc rollers or strike tube/bar. Closer to the center and in-between the strike tubes or arc rollers, a linkage and a cam system is provided in some embodiments that can adjust the angular range of the arcuate motion of the strike bars. In some embodiments of the invention, the linkages may be welded and adjustable or otherwise structurally connected so that adjustments can occur during manufacturing. However, in other embodiments the linkages may be attached for dynamic adjustment, so that they can be dynamically controlled based on sensor measurement, controller feedback, or remotely upon demand. FIG. 3B further illustrates the arc rollers including the strike tube with attached hinge gussets and drive gussets. Further views of the end caps are also shown. While various dimensions are shown, these dimensions may vary. For example, the strike tube diameter may be 3, 4, or 5 inches or other optimized dimension. FIG. 3C illustrates isometric, plan, and sectional views of the hinge gussets 57, gas spring gussets 59, and drive gussets 58. FIG. 3D illustrates isometric, plan and sectional views of the shaft bump roll pivot 60 and the spacer 67. FIG. 3E depicts a strike tube of the arc roller assembly with the drive gussets located substantially centrally along the length of the arc roller strike tube attached to a linkage and a cam. The rollers illustrated in FIG. 3A can be used as part of the KE-PE capture systems that are described above.

FIGS. 1A-3E, with the roadway cover, side plates and various sealants removed/not installed, show the structural framing members and arc roller strike mechanism in a spaced, rumble strip like pattern, according to some embodiments. The spacing can vary based on vehicle speed and/or load, etc. that are considered during the design of the system. The rumble strip arc roller/strike tubes/bars can be evenly spaced, or the spacing may be adjusted to maximize energy capture based on different expected average vehicle speeds and weights. In general, the bars are spaced farther apart as the expected average vehicle speeds increase. Average vehicle speed at the time of impact is estimated to be between 0 mph and 70 mph, where spacing of strike tubes may be increased based on increasing estimated average speed. Embodiments of the invention may include greater spacing between strike tubes for high speed applications. The greater spacing may be effective in avoiding hydroplaning. Further, while the strike tubes are shown as parallel, other angular patterns can be implemented for remediating debris build-up, such as gravel or sand build-up on the system. The angular patterns, in combination with vehicle and wind dynamics may provide clearing of the debris. Additionally, large tire sizes and vehicle mass may benefit from greater spacing. Thus, the spacing can be selected according to different expected average vehicle weights, from approximately 200 lbs. for a moped rider to military axle loading of over 80,000 lbs. per axle. The height of the strike tubes/bars may also be adjusted from −½" in a retracted position to +1" above the roadway or from ⅜" to ¾" or from ¹⁄₁₀" to 1" above the roadway. In some instances, municipalities may limit the extent of protrusion.

Figure 4:
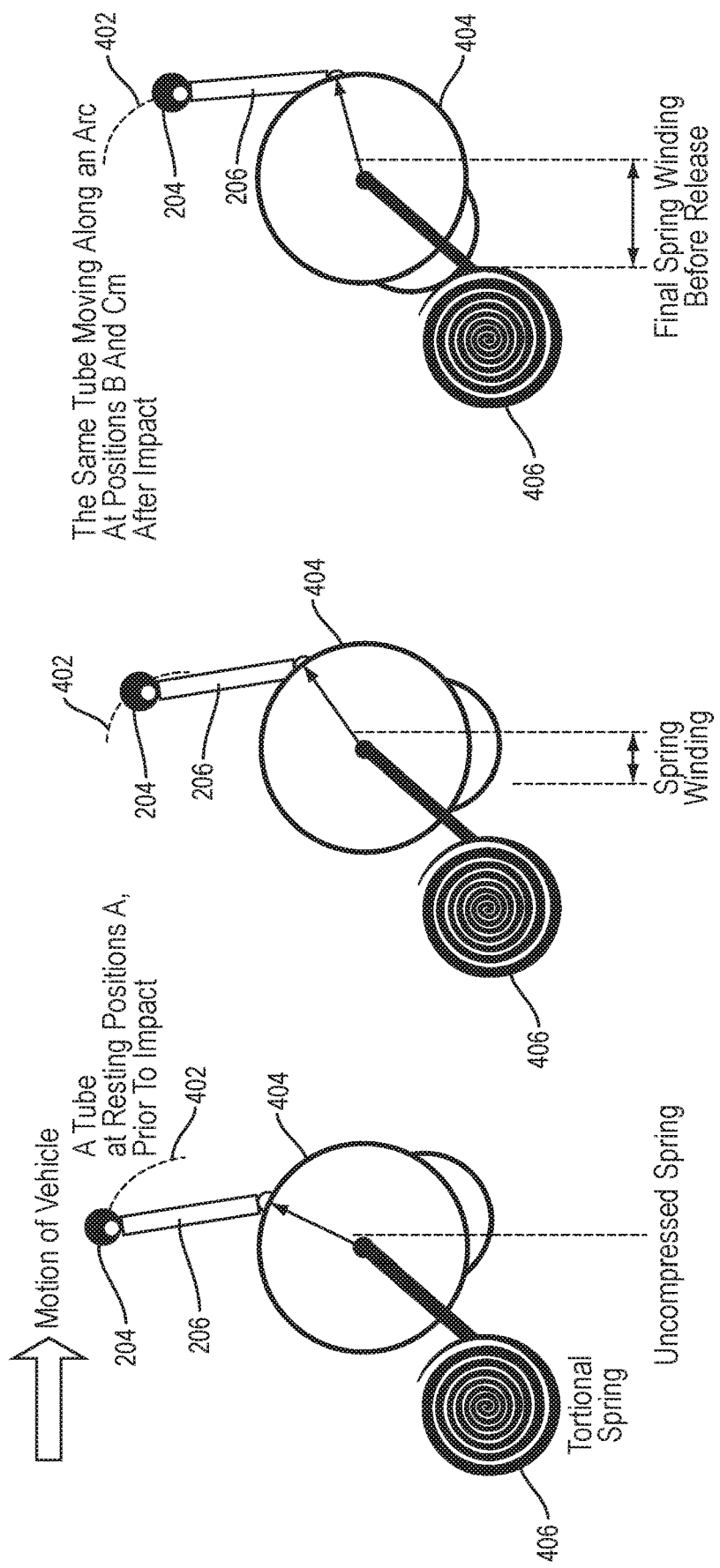
FIG. 4 is a schematic showing operation of the arc roller assembly of FIG. 3A in accordance with an embodiment of the invention.

FIG. 4 schematically depicts an embodiment of the energy capture mechanism discussed herein. As a vehicle impacts a strike tube or bar 204 of the arc roller assembly, the strike tube 204 (also called a bar or an arc roller) is pushed forward as well as downwards, and moves along an arc 402. The forward motion of the bar can capture at least a portion of the kinetic energy of the vehicle and the simultaneous downward motion can capture at least a portion of the potential energy of the vehicle. The bar is mechanically coupled through a suitable linkage 206 to a rotatable component 404 such as a cam, a disc, a ratchet wheel, etc. When a moving vehicle strikes the first bar in a series of bars, its velocity and correspondingly the kinetic energy (KE) are typically greater, respectively, than the vehicle's velocity and the corresponding KE when it strikes a subsequent bar. As such, the arcuate movement of different bars, and the corresponding movements of the rotatable component can be different. Specifically, the Angle 4 (shown in FIG. 5) can be different for different rotatable components. When the expected maximum Angle 4 for a particular rotatable component 404 is reached, a return mechanism associated with the corresponding bar is engaged, which allowed the bar to return to its rest position (shown in FIG. 4).

Figure 9:
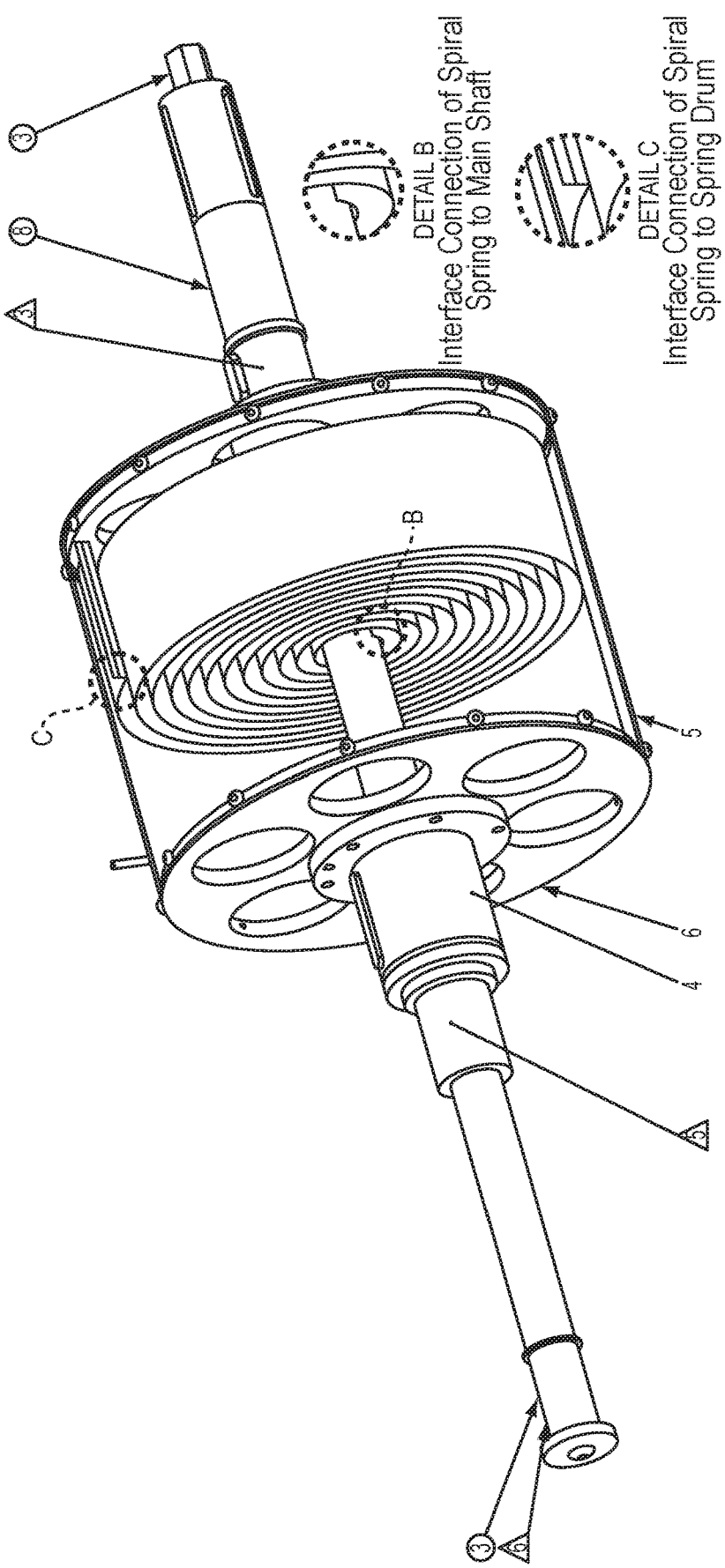
FIG. 9 is an isometric view of an energy storage assembly in accordance with an embodiment of the invention.

The rotatable component 404 is mechanically coupled to a torsional spring 406, e.g., via a coupling shaft, such as that shown in FIG. 1A and FIG. 9. Therefore, as the component 404 rotates, the torsion spring is wound, storing the energy captured by the arcuate movement of the bar 204. In some embodiments, several (e.g., 2, 3, 4, or more) bars are mechanically coupled to the same rotatable component 404. The vehicle would impact the bars in sequence and, as such, each bar may move along a respective arc in sequence The movement of the bars may overlap, however, i.e., before the motion of one bar is completed, another bar may begin to move along its respective arc. The rotation of the rotatable component would continue from the arcuate movement of other bar(s), causing continued winding of the torsional spring. Thus, the torsional spring can store the kinetic and potential energy captured by the arcuate motions of several bars.

In some embodiments, two or more rotatable components 404 are used, where one or more but not all bars are coupled to a different rotatable component. All rotatable components 404 are coupled to the same shaft, however, that couples the different rotatable components 404 to the torsion spring 406. Some other embodiments use two or more torsion springs. In these embodiments, different rotatable components are coupled to different torsion springs via respective coupling shafts. The resistance of the different torsion springs can be different. For example the a larger torsion spring having a high resistance may be coupled to the first bar and a smaller torsion spring having less resistance may be coupled to a subsequent bar (e.g., the second bar, third bar, fifth bar, etc.).

An advantage of the multi-torsion spring configuration is that it can accommodate the changing kinetic energy (KE) of a moving vehicle as it strikes different bars in a sequence. As noted above, when a vehicle strikes the first bar, its velocity and correspondingly the KE are typically greater, respectively, than the vehicle's velocity and the corresponding KE when it strikes the subsequent bar. The arcuate movement of the first bar can therefore transfer a greater amount of energy than that transferred by the movement of a subsequent bar, and the energy transferred by the first bar can be stored in the larger torsion spring having a greater resistance. In some cases, the movement of the subsequent bar may not transfer a sufficient amount of KE so as to effectively wind the larger torsion spring and, as such, that KE may not be captured efficiently, if the subsequent bar is coupled to the larger torsion spring. Therefore, the subsequent bar is coupled to a different, smaller torsion spring, which can be wound with less energy and can efficiently store a smaller amount of energy.

When the energies stored in the two (or more) torsion springs are to be converted into electricity, the larger torsion spring may be allowed to unwind first, causing the shaft of the generator (such as that shown in FIG. 8A) to rotate, e.g. from a rest position. Because a larger amount of energy is stored in the larger torsion spring it can overcome the inertia of the generator shaft. When the larger torsion spring is partially or completely unwound, while the generator shaft is still rotating, another, smaller torsion spring may be allowed to unwind. While this spring may not supply enough energy to overcome the inertia of the generator shaft, it may be able to extend the rotations of the already rotating generator shaft. As such, a relatively smaller amount of KE captured by the movement of a subsequent bar can also be utilized to generate electricity.

The one or more torsional spring used in various embodiments can be specified in terms of one or more parameters of the strip or wire that is wound. These parameters include one or more of the length of the strip/wire, the width of the strip or gauge of the wire, and the thickness of the strip. The specification of the torsion spring may also include the wrap count or the number of turns of the strip/wire, and the material of the strip/wire. The material is generally a metal or alloy, e.g., steel, copper, or alloys thereof. The steal used in a torsion spring may be specified using the standards developed by the American Iron and Steel Institute (AISI) or Society of Automotive Engineers (SAE) International. For example, the steel used can be AISI/SAE 1040, AISI/SAE 1070, AISI/SAE 1077, AISI/SAE 1095, stainless steel, etc. In some embodiments, a torsion spring made using a 2 inch wide 22 ft. long strip of AISI/SAE 1077 steel is used. In some other embodiments, a torsion spring made using a 3 inch wide 32 ft. long strip of AISI/SAE 1095 steel is used. Other combinations of the various parameters described above are also contemplated. Coil space separators may be used in some embodiments to minimize friction loss then the torsion spring uncoils or unwinds.

A cam, threaded shaft, keyway, or other clutch mechanism affixed to the rotatable component (404 (FIG. 4)) can be used to determine that a preselected maximum degree of spring winding is achieved and, upon reaching such maximum winding, the torsional spring is allowed to unwind. At that time, another spring assembly (such as that shown in FIG. 3E) allows the bar to return to its original position. The rapidly unwinding torsional spring can rotate a shaft, e.g., through a gear and/or pulley assembly. The rotating shaft can rotate an armature within a magnetic field, which would generate electricity.

In general, the range of the angle associated with the arcuate movement of a bar corresponds to the total energy that can be captured by the motion of the bar. Specifically, the larger the angle, the larger the amount of energy that can be captured. The energy that can be captured is limited, however, by the energy resulting from the impact of the moving vehicle with the bar. If a relatively small amount of energy would result from the impact, allowing the bar to move through a large angle (e.g., more than 50°, 75°, 100°, 120°, etc.) is often ineffective and/or inefficient, because the bar may not actually move through the entire permissible angular range. This can occur when the impact is between the bar and a lighter vehicle (e.g., a car, a crossover, a sports utility vehicle (SUV), a minivan, etc.) and not with a heavier vehicle (e.g., a loaded truck, a recreation vehicle (RV), a bus, a tractor-trailer, etc.). Additionally, or in the alternative, the energy from the impact may be small when the vehicle is moving very slowly (e.g., at 1, 2, 5 miles per hour (mph), etc.) and not faster (e.g., at 10, 15, 25 mph, etc.).

In order to increase the efficiency of capturing the impact energy or to maximize the capture of the impact energy, the angle associated with the arcuate movement of the bar can be adjusted. For example, the angle can be set to about (i.e., within a tolerance of 0.5%, 1%, 2%, 5%, etc.) 25°, 45°, 90°, 100°, etc. In general, a vehicle is expected to slow down as it approaches the first bar and may slow down even further as it passes over the other bars. Therefore, the angles corresponding to the arcuate movement of the successive bars in a series can be successively smaller than the angles corresponding to the preceding bars. In some case, these angles are preset. The movement of the roller is a function of both the arc radius and the angular movement. For example, 90 degrees of movement along an arc having an arc radius of 5 inches is less than 30 degrees of movement along an arc radius of 25 inches.

In other cases, the angles can be dynamically during operation. In other embodiments, the angles may be adjusted prior to operation. In order to have the angle adjustments occur during operation, the structure must be assembled with dynamically adjustable connections. A sensor assembly may evaluate vehicle weight and vehicle speed, transmit these parameters to a controller. The controller may then calculate angles facilitating maximum energy capture based on these parameters and dynamically adjust the angles accordingly. In other embodiments, when the components are welded or require tactile manipulation for angle adjustment, the angles may be adjusted between uses or during manufacturing based on data captured by the sensor assembly or other known data. For example, the movement of the first bar can be analyzed to determine the weight and/or speed of the vehicle and, according to the weight and/or speed, the angles associated with the other bars can be adjusted. If the weight, speed, and/or momentum of the vehicle is relatively high, the next bar or bars may be allowed to move through a larger angle of arcuate motion. Otherwise, a relatively smaller angle may be allowed.

Figure 5:
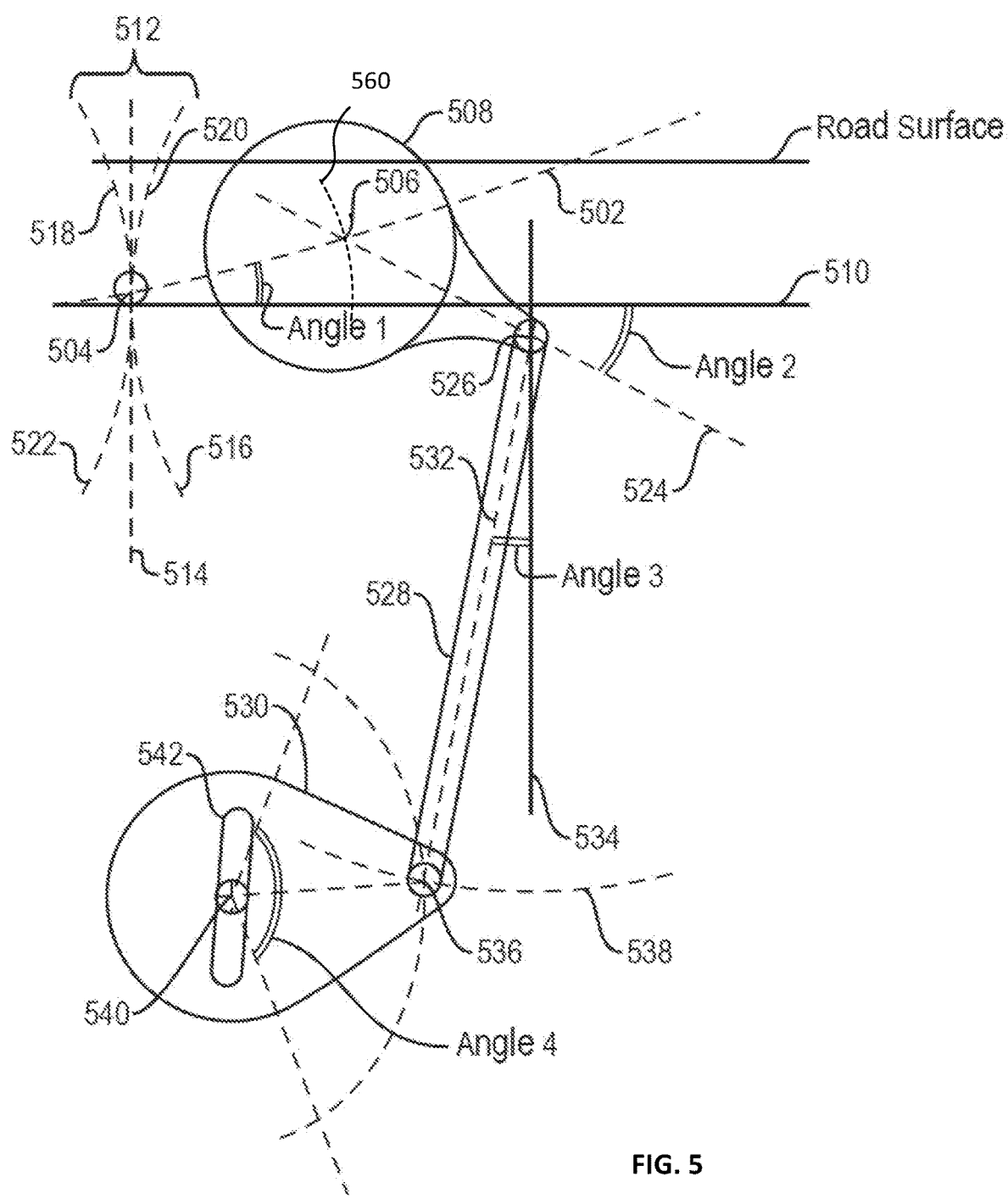
FIG. 5 is a sectional diagram showing operation of the arc roller assembly of FIG. 3A.

FIG. 5 schematically depicts the arcuate movement of a bar/roller 508 (roller 204 (FIG. 4)) along an arcuate path 560 (arc 402 (FIG. 4)) and its different settings, and various associated angles that can be controlled according to the application Specifically, FIG. 5 shows four different angles associated with the operation of the system, where one or more angles may be adjustable. Angle 1 is an impact pivot angle defined between a plane 502 passing through a pivot 504 and a central axis 506 of a roller 508 and a reference plane 510 (e.g., the plane of or a plane parallel to the road surface). The location of the pivot 504 and/or Angle 1 determines the initial position of the strike bar/roller 508 relative to the road surface. In some embodiments of the invention, the pivot 504 is placed in a ladder cradle system 512 or other similar mechanism, so that the location of the pivot 504 and/or Angle 1 can be adjusted. In various embodiments of the invention, the ladder may be a steel rod or bar having a diameter of approximately one inch that operates as a peg board that can be moved in increments.

In applications where the vehicles are expected to move at a relatively high speed (e.g., about 10 mph, 15 mph, or more), and/or heavier vehicles (e.g., trucks, busses, etc.) are expected to strike the bar/roller, the location of the pivot 504 may adjusted upwards along a path 514, such that a greater portion of the roller 508 is above the road surface. Alternatively, the location of the pivot 504 may be adjusted along arcs 516 or 518 such that Angle 1 is high (e.g., more than 10°, 20°, 25°, 30°, etc.). On the other hand, in applications where the vehicles are expected to move at a relatively slow speed (e.g., less than about 10 mph, 5 mph, or less), and/or lighter vehicles (e.g., cars, vans, light trucks, etc.) are expected to strike the bar/roller 508, the location of the pivot 504 is adjusted downward along the path 514. Alternatively, the location of the pivot 504 may be adjusted along arcs 520 or 522 such that Angle 1 is low (e.g., less than 10°, 5°, 0° (i.e., parallel to the road surface), −5°, etc.). When compared to the depiction of the arc roller in FIG. 3A, the Angle 1 in FIG. 5, is based on movement about the shaft bump roll pivot 60 in FIG. 3A.

Angle 2 of FIG. 5 represents redirected impact energy, and is formed between a plane 524 passing through a joint 526 and the central axis 506 of the roller 508 and the reference plane 510 (e.g., plane of the road surface). In FIG. 3A, the joint 526 of FIG. 5 may include the shoulder bolt 62 and spacer 67 connected to the gas spring gussets 58. Angle 2 complements Angle 1 in that if the pivot 504 is fixed and, as such, the initial location of the pivot 504 and Angle 1 are not adjustable, Angle 2 can be adjusted, instead. Angle 2 determines the initial, i.e., prior to impact position of the tie rod 528 because the top end of the tie rod 528 is coupled to the roller 508 via the joint 526.

Typically, in applications where the vehicles are expected to move at a relatively high speed (e.g., about 10 mph, 15 mph, or more), and/or heavier vehicles (e.g., trucks, busses, etc.) are expected to strike the bar/roller, Angle 2 may be set in a range of 35° to −10° relative to the road surface. On the other hand, in applications where the vehicles are expected to move at a relatively slow speed (e.g., less than about 10 mph, 5 mph, or less), and/or lighter vehicles (e.g., cars, vans, light trucks, etc.) are expected to strike the bar/roller, Angle 2 may be set in a range of 15° to −45° relative to the road surface. In general, the more the portion of the roller 508 above the road surface, and/or the greater the Angle 1, and/or the greater the Angle 2, the greater the rotation of the cam 530, resulting in a relatively greater transfer of energy from the impact of the vehicle to the energy storage system.

Angle 3 represents the angle of an outside stroke due to angular impact, and is defined as the angle between the central axis 532 of the tie rod 528 and another reference plane 534 (e.g., a vertical plane). Angle 3 can be adjusted by moving another joint 536 along an arcuate path 538. The range of Angle 3 can be −30° to +30°, −10° to +45°, etc. The lower end of the tie rod 528 is coupled to the cam 530 at the joint 536. Angle 4 measures the rotation of the cam 530 about its center 540, and represents the rotational energy that is transferred from the impact between a vehicle and the roller 508 to the cam 530. In general, the greater the rotation of the cam 530, the greater the amount of energy captured from the impact and transferred to the cam 530, for subsequent storage. Depending on the initial location of the pivot 504, Angle 1, and/or Angle 2, the center 540 of the cam 530 may be moved up or down in the slot 542 so that the rotation of the cam 530 due to the impact, i.e., Angle 4 can be maximized. In some cases, upon each impact, the cam rotates at least 170° and may rotate up to 220°. In other embodiments, the range of Angle 4 can be different, e.g., only up to 50°, 90°, 120°, etc., and can be up to 250°, 270°, 300°, or more.

Adjusting one or more of: (i) the location of the pivot 504; (ii) Angle 1; (iii) the location of the joint 526; (iv) Angle 2; (v) the location of the joint 536 along the path 538; and (vi) the location of the center 540 of the cam 530, may cause a change in one or more of these parameters and/or may require an adjustment to one or more of these parameters. In general, these locations and angles are adjusted together so that the rotation of the cam 530, represented by Angle 4, is maximized.

In some embodiments, operation of the system starts with the leading tubular strike member/bar, which is separated from subsequent (e.g., three) strike tubes/bars, to provide for slight time delay for mechanical cam and linkage system to increase the range of the angular movement of the bars and/or the resistance on subsequent strike members when a heavy vehicle impacts the first strike mechanism. The resistance can be increased by adjusting, using couplers or an equivalent, the position of the cam that determines the limit up to which the torsional spring may be wound before releasing the torsional spring. In various embodiments the tension in the torsional spring (or output torque of the torsional spring), prior to the release thereof, may increase up to 36 ft./lbs., 50 ft./lbs., 80 ft./lbs., etc., due to the winding of the spring, e.g., caused by a light vehicle moving at a slow speed striking one or more arc rollers. In other embodiments, the tension in the torsional spring (or output torque of the torsional spring), prior to the release thereof, may increase up to 100 ft./lbs., 120 ft./lbs., or more, due to the winding of the spring, e.g., caused by a heavy vehicle moving at a high speed striking one or more arc rollers. A heavy impact action by a vehicle can increase a cam angle which can move cams associated with other strike members so as to increase the associated torsional spring resistance and/or the range of angular movement of these strike bars. Some increase in energy capture of heavier vehicles can thus be achieved through this adaptive capture system.

In some embodiments, the movement of the first arc roller 5 caused by the impact from one wheel (e.g., one front wheel of a vehicle), or the simultaneous impact from a pair of wheels (e.g., both front wheels of the vehicle) by itself, causes at least one full rotation of the coupling shaft and, accordingly, at least one full windings of the torsion spring coupled to that shaft. The movements of the subsequent arc rollers caused by the same wheel(s) can cause additional partial and/or full windings of the torsion spring. As such, after the front wheel(s) pass over the assembly of arc rollers, the torsion spring may be wound a number of times, where the number of windings can be 1.5, 1.75, 2, 2.5, 3, or more. The passing of the rear wheel(s) would repeat this process and, unless unwound between the passing of the front and the rear wheels, the torsion spring would be wound further. The number of windings caused by the passing of the rear wheel(s) is generally the same as the number of windings caused by the passing of the front wheel(s).

In other embodiments, the movement of the first arc roller caused by the impact from one wheel (e.g., one front wheel of a vehicle), or the simultaneous impact from a pair of wheels (e.g., both front wheels of the vehicle), causes only a partial rotation of the coupling shaft and a fraction of one full winding of the torsion spring, e.g., 80%, 75%, 60%, 50%, 35%, 10%, etc. The movement of each of the subsequent arc rollers caused by the same wheel(s) can cause additional partial windings of the torsion spring, e.g. 50%, 40%, 25%, 10%, 5%, etc. As such, after the front wheel(s) pass over the assembly of arc rollers, the torsion spring may be wound a number of times, where the number of windings can be greater than one, representing at least one full winding such as 2, 1.5, 1 winding, etc., or can be less than one, representing a partial winding such as 0.8, 0.75, 0.6, 0.5, 0.25 etc. The passing of the rear wheel(s) would repeat this process and, unless unwound between the passing of the front and the rear wheels, the torsion spring would be wound further. Here again, the number of windings caused by the passing of the rear wheel(s) is generally the same as the number of windings caused by the passing of the front wheel(s).

Figure 6:
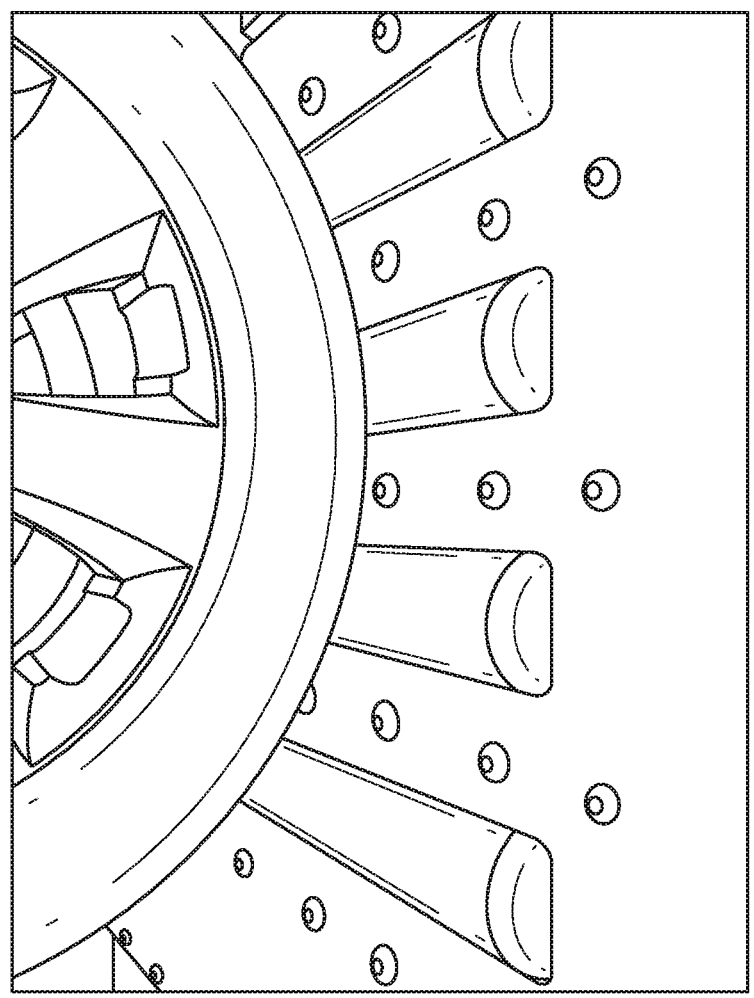
FIG. 6 is depicts an outer surface of the energy capture system in contact with a vehicle in accordance with an embodiment of the invention.
Figure 7:
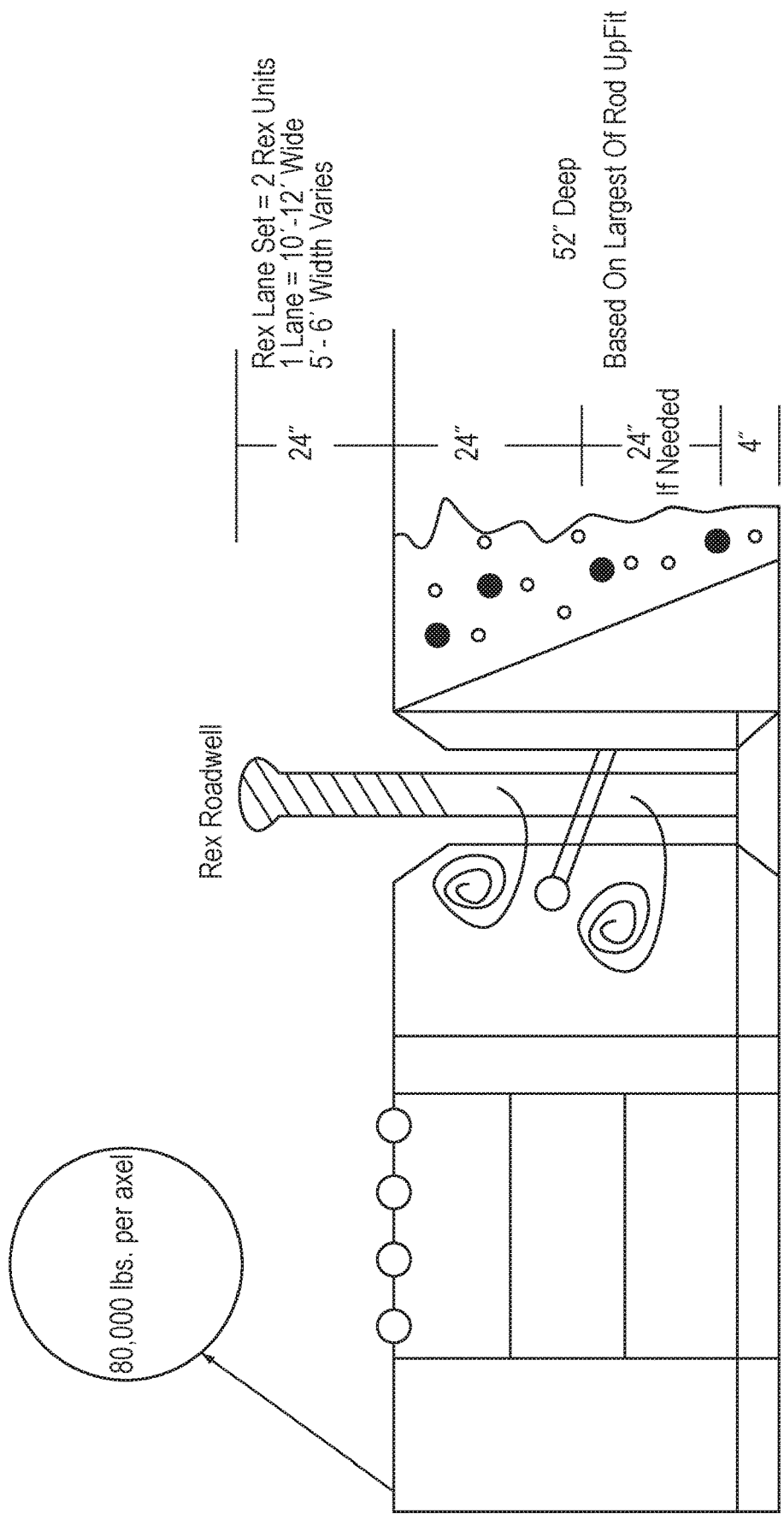
FIG. 7 is a sectional view of an installed energy capture system in accordance with an embodiment of the invention.

FIG. 6 depicts the wheel of a moving vehicle causing the arc rollers to be depressed and to move along an arc. FIG. 7 shows a protective structure to protect the energy capture and conversion system when it is embedded in a roadway. The protective structure may include a rubber or epoxy coating and/or acid etched materials. Further, the top protective structure is configured to be explosion proof in order to comply with regulations, such as Department of Defense regulations. Further, the entire structure is tamper proof and may be painted to accommodate local and application requirements.

Figure 8A:
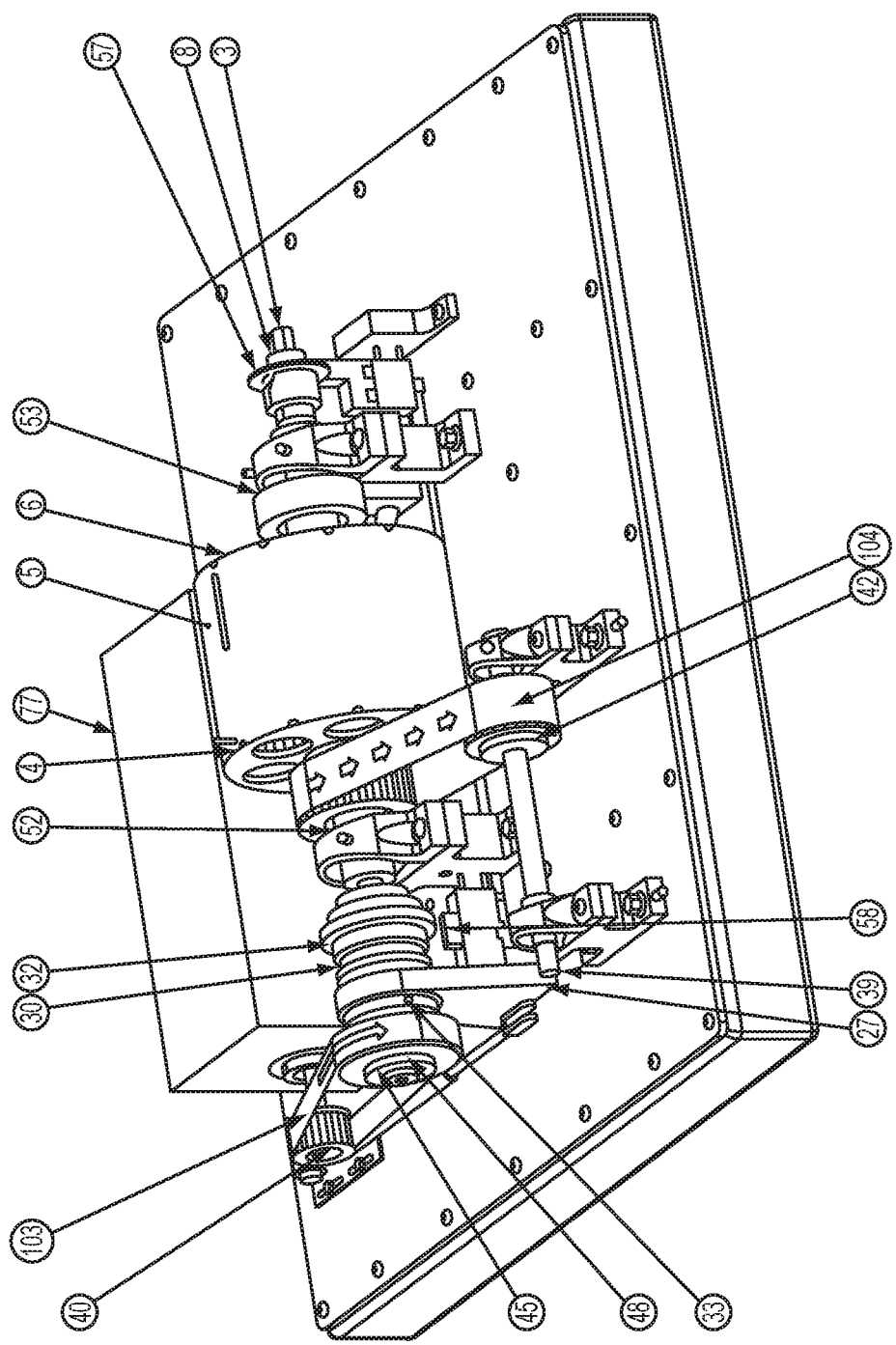
FIG. 8A is an isometric view of the energy conversion system in accordance with an embodiment of the invention.
Figure 8B:
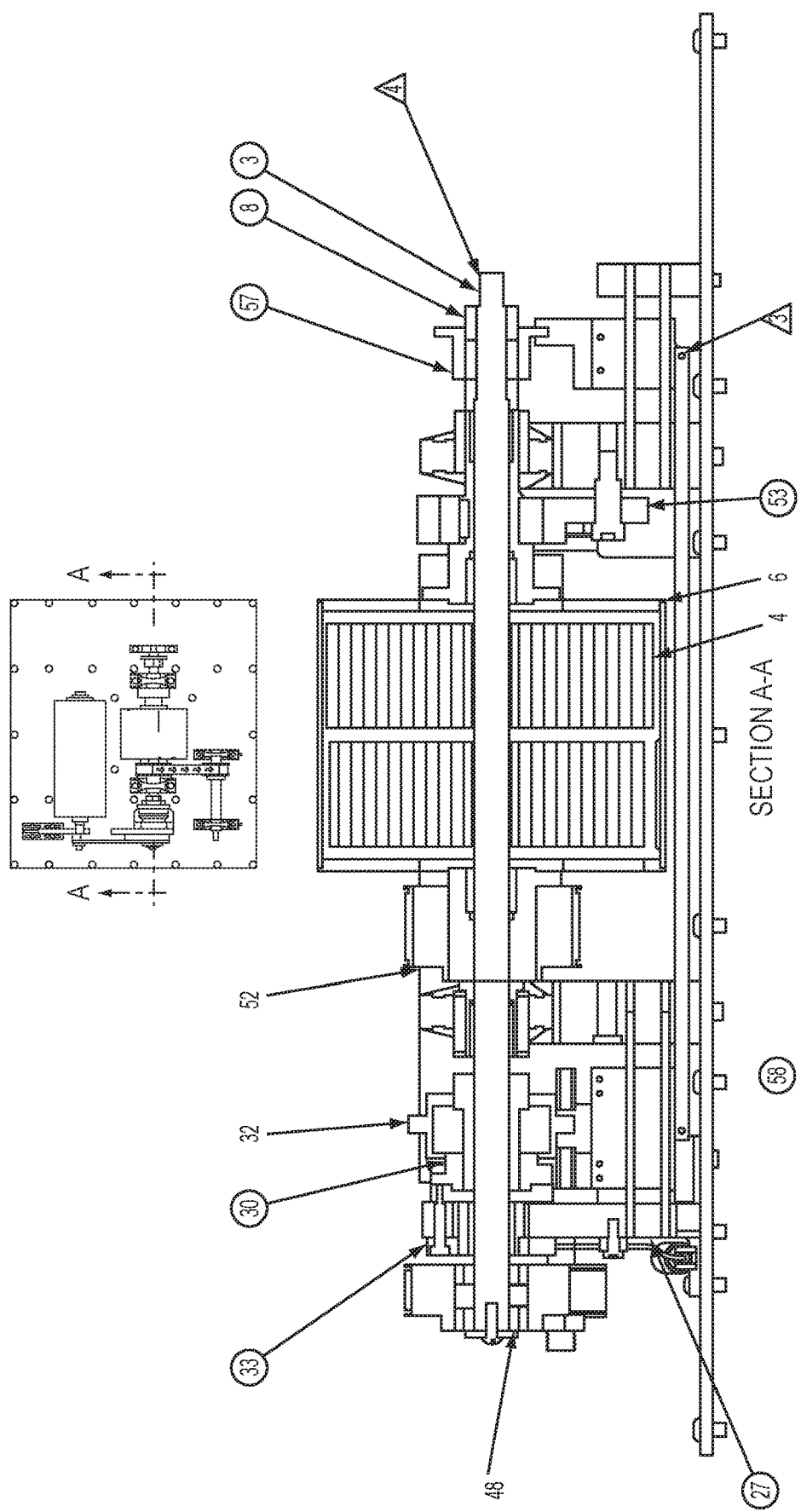
FIG. 8B is a sectional view of the energy conversion system in accordance with an embodiment of the invention.

FIGS. 8A and 8B depict two views of an embodiment of the conversion system or energy storage and release subsystem that can be included in KE-PE capture and conversion system. As shown in FIG. 8A, an input shaft is coupled through pulleys 42 and a belt 52. In operation, in one embodiment of the invention, intermittent rotation of the input shaft coupled through the pulleys and the belt rotates a spring drum 5 in a clockwise direction and winds an outer diameter of spiral springs 4. Inner diameters of the spiral springs 4 are restrained by a main shaft 3 and a clutch 30. Reverse counterclockwise rotation of the spring drum 5 is prevented by a backstop clutch 53 that is connected via an endplate 6 to a spindle 8. As spring drum 5 rotates relative to the main shaft 3, a shift collar 57 advances and couples to a clutch control ring 32 via a pair of slide blocks 66 and 58. The clutch 30 disengages after a set number of rotations of the drum 5 relative to the main shaft 3 or at torque overload. Once the clutch 30 disengages, the main shaft 3 rotates in a clockwise direction and pops a shock to drive an alternator 77 via a drive pulley 45, belt 103, and pulley 40. The shock can be gas, pneumatic, compression spring, or turning screws.

With the clutch 30 disengaged, additional input via the input shaft 39 is allowed and enables coupling to the spiral springs 4. As the main shaft 3 rotates relative to the spring drum 5 and the spiral springs 4 unwind, the shift collar 57 retracts and re-engages the clutch 30 before the spiral springs 4 completely unwind, thus maintaining the springs in a preload turns condition. When the clutch 30 re-engages, a clutch pivot 33 allows the clutch 30 to rotate, for example up to 45 degrees, to reduce surge on the clutch mechanism and avoid disengagement from kick-back.

A swing arm couples the clutch pivot 33 to a spring or damper 27 to slow rotation and return the clutch pivot 33 to a start position when the clutch 30 disengages. Additionally, an overrunning clutch 48 disengages the pulley 45 from the shaft 3 when the clutch 30 re-engages to reduce surge on the clutch from the rotational inertia of the pulleys 45 and 40 and the alternator 77. The alternator 77 is voltage load regulated to maximize spring energy recovery and slow the main shaft 3 sufficiently to re-engage the clutch 30. In embodiments of the invention, spring unwinding time may be between two and six seconds in operation with multiple 1.5 kW or other performance applications using low speed alternators and may vary based on the output pulley ratio and planetary gearing.

As shown in FIG. 8B, a shift collar 57 is attached at a threaded end of the shaft 3. The spring 5 is connected to the shaft 3 as it winds and the threads on the end pull back the shift collar 57, which pulls the rod 68 out to connect with a shift mechanism in the clutch 30. Thus, the entire shift collar moves rod 68 and after being pulled beyond a predetermined point, the clutch 30 is released. The shift blocks 58, 59, 63, catch and control spinoff and re-engagement of the clutch 30.

FIG. 9 depicts an isometric view of a mechanism used for energy storage and release, according to one embodiment. The mechanism includes a coil drum enclosing the spiral spring. An end cover 6 is positioned at one end of the drum. The main shaft 3 extends through the drum and spiral spring. In order to create the assembly, the spiral spring is positioned on the shaft 3. The spring is wound and compressed radially to allow insertion into the drum 5.

Figure 10:
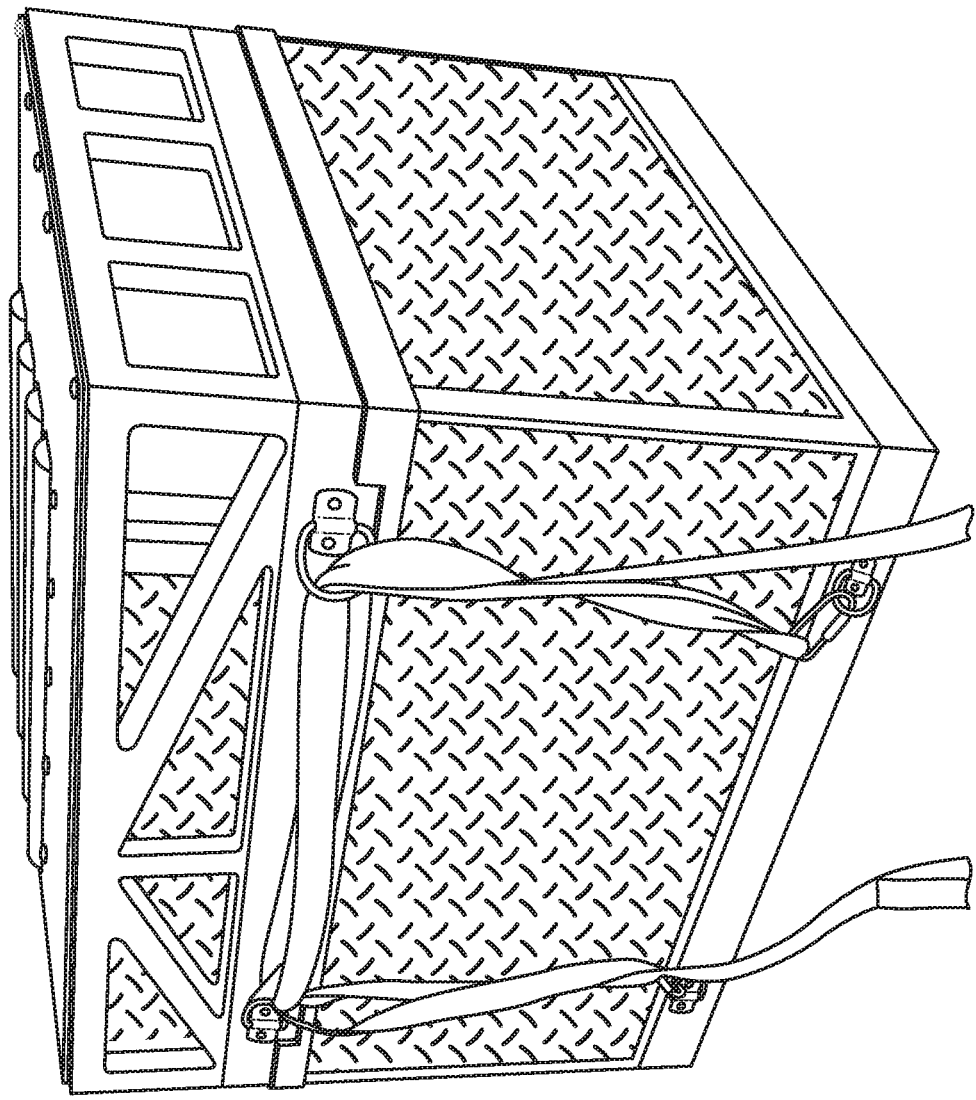
FIG. 10 is an isometric view of an assembled capture and conversion system in accordance with an embodiment of the invention.

FIG. 10 is an isometric view of a fully assembled capture and conversion system in accordance with an embodiment of the invention. The system is illustrated with covers, which can be using during transport and storage in order to protect the assembly. The illustrated assembly is a stacked capture and conversion assembly, such as that shown in the embodiments of FIGS. 1B and 1C.

Figure 11:
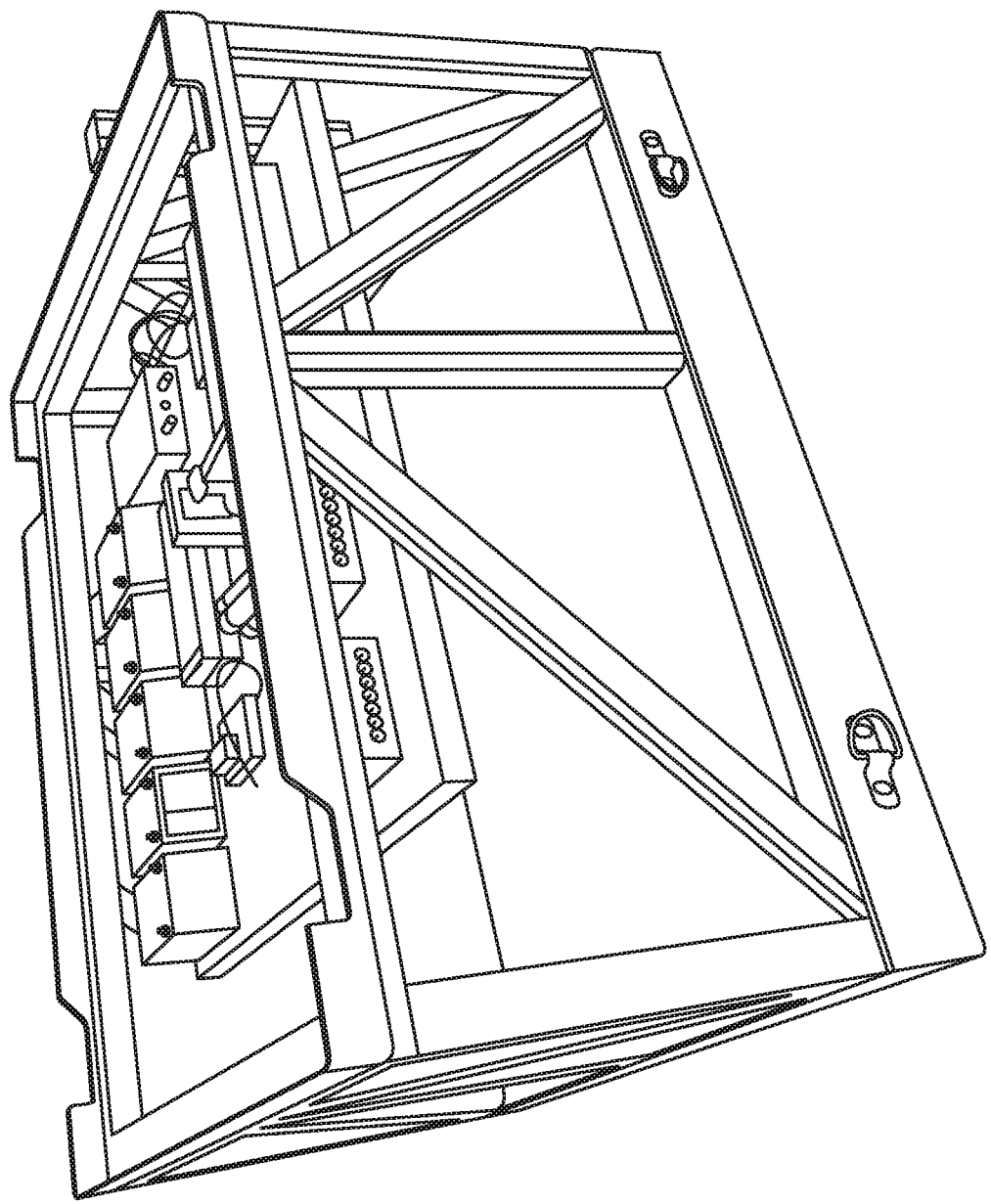
FIG. 11 is a disassembled view of the capture and conversion system in accordance with an embodiment of the invention.

FIG. 11 is a disassembled view of the capture and conversion system in accordance with an embodiment of the invention. FIG. 11 illustrates a conversion assembly on the left, on which the capture assembly on the right can be stacked. The covers are removed in order to allow viewing of internal system components.

Figure 12:
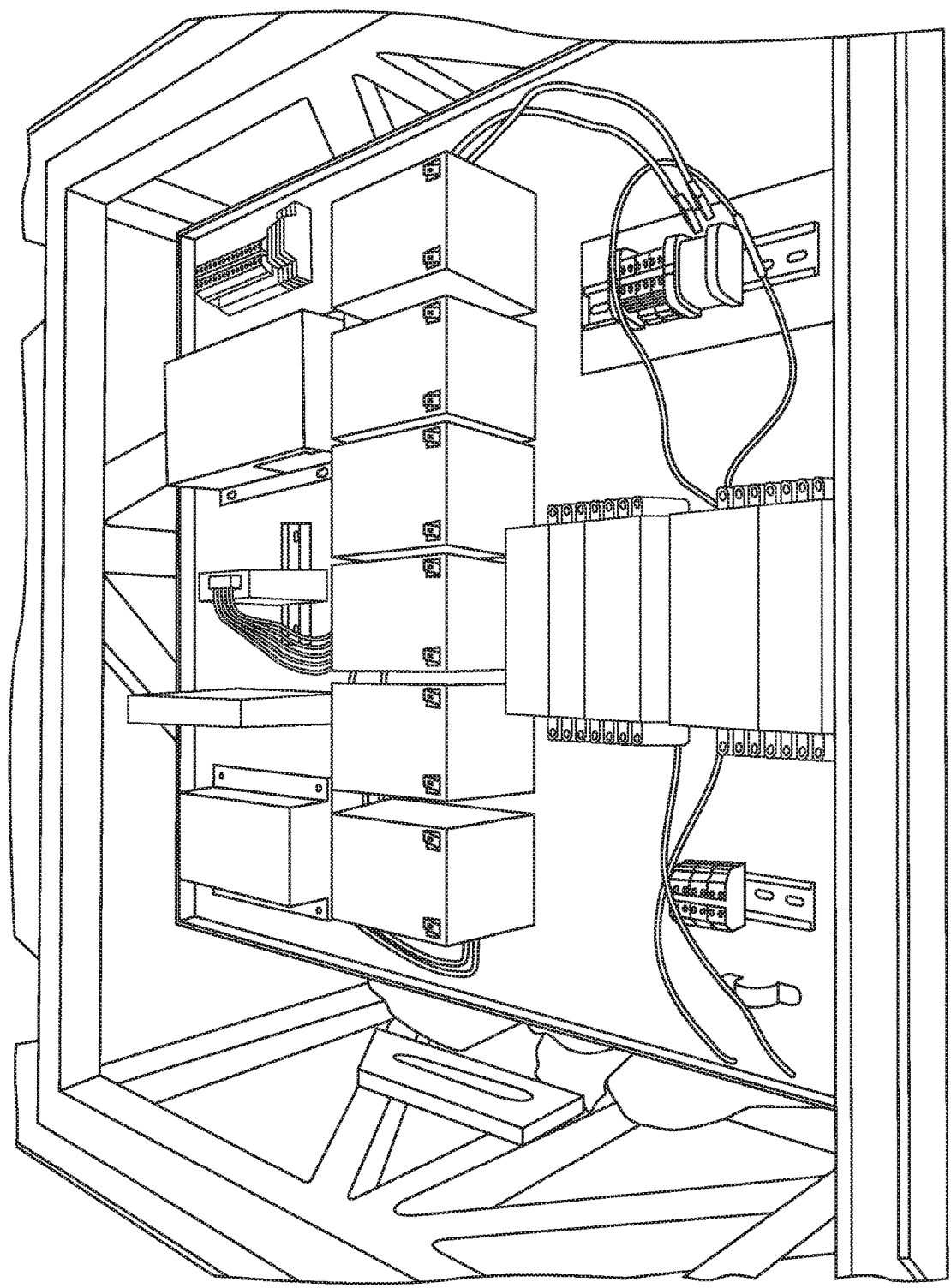
FIG. 12 is a view of an electrical systems tray in accordance with an embodiment of the invention.

FIG. 12 is a view of an electrical systems tray in accordance with an embodiment of the invention. The electrical systems tray may be stacked in between the capture system and the conversion system in embodiments of the invention. Alternative configurations are also within the scope of the invention. As illustrated, the electrical systems tray may include operational controllers, fusible links, networked links, battery storage, and power dump. The operational controllers may interact with sensors operating to detect, for example, vehicle speeds, frequency or cycles, temperature, and humidity. The sensors may further facilitate improved Wi-Fi communications and may include optical sensors providing internal video. Video showing existing conditions may be captured, for example, using vehicle dash cams, cell phone cameras, or other cameras, and transmitted via Wi-Fi. In embodiments of the invention, a fire suppression system may be connected with the temperature sensor and activated when temperatures exceed predetermined threshold levels.

In general, various embodiments described here in can be used in different traffic conditions and to capture the potential and kinetic energy from a range of moving vehicles, moving at different speeds. For example, the gross vehicle weight (GVM) can range from 500 lbs. up to 80,000 lbs. Vehicles weighing less than 10,000 lbs. may be classified as light vehicles and those weight 10,000 lbs. or more may be classified as heavy vehicles. These vehicles may move relatively slowly when they impact the first arc roller, i.e., at speeds less than 5 mph, less than 10 mph, less than 20 mph, or less than 30 mph. The vehicles may also move fast, i.e., at speeds greater than 15 mph or greater than 30 mph, e.g., up to 80 mph. The kinetic energy (KE) associated with the light vehicles moving at slow speeds (less than 30 mph) may range from 0.5 kJ up to 350 kJ, while the KE associated with the light vehicles moving at high speeds (at 30 mph or higher) may range from 20 kJ up to 2,500 kJ. The KE associated with the heavy vehicles moving at slow speeds may range from 10 kJ up to 3,500 kJ, and the KE associated with the heavy vehicles moving at high speeds may range from 400 kJ up to 21,000 kJ. Various embodiments described herein can capture and convert at least 5%, 8%, 10%, 12% 14%, or 200% of this energy.

Energy harvested through the above described system may be utilized to charge integrated battery cells, which are then utilized to power operating systems and specialty equipment. Excess power can be net metered into the electrical grid. The system can generate power anywhere traffic can be found with simple installation in a few hours and no cost to the public. Sensors may be coupled to the system for self-diagnostics, wireless communications, traffic controls, weights and measures, and security applications such as the road intrusion wall, vehicle identification, and electromagnetic pulse (EMP) and chemical, biological, radiological, and nuclear (CBRN) detection. In embodiments of the invention, monitoring and control software may display user interfaces enabling greater control and monitoring by individuals viewing the interfaces on computing devices. In embodiments of the invention, the system can be utilized to power highway signs in order to warn approaching traffic of speed limitations and manage lights by maximizing flows.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A system for capturing at least a part of kinetic energy (KE) of a moving vehicle upon impact thereof with at least one arc roller, the system comprising:
   a first arc roller having a first central axis of rotation, wherein upon being impacted by the moving vehicle the first arc roller is configured to move such that the first central axis of rotation moves along a first arcuate path;
   a first linkage linking the first arc roller to a first rotatable component;
   a primary torsional spring coupled to the first rotatable component, configured to wind upon at least a partial rotation of the first rotatable component by arcuate movement of the first arc roller and the first central axis of rotation thereof, until the first rotatable component reaches a first preset position;
   a first return mechanism to return the first arc roller to an initial position thereof when the first rotatable component reaches the first preset position;
   a second arc roller having a second central axis of rotation, wherein upon being impacted by the moving vehicle the second arc roller is configured to move such that the second central axis of rotation moves along a second arcuate path;
   a second linkage linking the second arc roller to a second rotatable component; and
   a second return mechanism to return the second arc roller to an initial position thereof when the second rotatable component reaches a second preset position,
   wherein the primary torsional spring is: (i) coupled to the second rotatable component, and (ii) configured to wind further upon rotation of the second rotatable component by arcuate movement of the second arc roller and the second central axis of rotation thereof.

2. The system of claim 1, wherein the second arc roller is coupled to an adjustable component adapted to adjust an angular range of the second arc roller.

3. The system of claim 2, wherein the adjustable component is coupled to the first linkage.

4. The system of claim 1, wherein the first rotational component comprises an adjustable cam that determines the first preset position.

5. The system of claim 1, further comprising:
   an electrical generator coupled to the primary torsional spring.

6. The system of claim 1, wherein the first arc roller is between 3 and 7 inches in diameter.

7. The system of claim 1, further comprising between four and seven arc rollers disposed parallel to one another.

8. The system of claim 1, wherein the first arc roller is attached to a pivot point and the first arc roller is oriented at a first impact pivot angle.

9. The system of claim 8, wherein the first impact pivot angle is adjustable through a ladder mechanism.

10. The system of claim 8, wherein the first arc roller is connected by a joint to the first rotatable component, wherein a second angle between: (i) a first plane passing through the joint and the first central axis of rotation of the first arc roller, and (ii) a second plane defining a road surface, represents redirected impact energy.

11. The system of claim 8, wherein:
    a third angle between an initial position of the first rotatable component and a vertical reference plane represents an outside stroke due to angular impact; and the third angle is adjustable through movement of a link between the first arc roller and the first rotatable component.

12. The system of claim 10, wherein a fourth angle comprises an angle of rotation of the first rotatable component due to impact and varies based on the first impact pivot angle and the second angle.

13. The system of claim 1, wherein the primary torsional spring includes a clutch operated by a rotation of the primary torsional spring, wherein the clutch disengages to drive an alternator when the primary torsional spring reaches a predetermined rotational threshold and unwinds when the clutch disengages.

14. A method for assembling a system for capturing at least a part of kinetic energy (KE) of a moving vehicle upon impact thereof with at least one arc roller, the method comprising:
mounting on a frame a first arc roller having a first central axis of rotation, wherein, upon being impacted by the moving vehicle, the first arc roller is configured to move such that the first central axis of rotation moves along a first arcuate path;
coupling a first linkage linking the first arc roller to a first rotatable component;
coupling a primary torsional spring to the first rotatable component, wherein the primary torsional spring is configured to wind upon at least a partial rotation of the first rotatable component by arcuate movement of the first arc roller and the first central axis of rotation thereof;
coupling a first return mechanism to the first arc roller to return the first arc roller to an initial position thereof when the first rotatable component reaches a first preset position;
mounting on the frame a second arc roller having a second central axis of rotation, wherein, upon being impacted by the moving vehicle, the second arc roller is configured to move such that the second central axis of rotation moves along a second arcuate path;
coupling a second linkage linking the second arc roller to a second rotatable component;
coupling the second rotatable component to the primary torsional spring; and
coupling a second return mechanism to return the second arc roller to an initial position thereof when the second rotatable component reaches a second preset position,
wherein the primary torsional spring is configured to wind further upon rotation of the second rotatable component by arcuate movement of the second arc roller and the second central axis of rotation thereof.

15. The method of claim 14, further comprising:
linking the second arc roller to an adjustable component adapted to adjust an angular range of the second arc roller.

16. The method of claim 15, further comprising:
coupling the adjustable component to the first linkage, whereby movement of the first arc roller adjusts the angular range of the second arc roller.

17. The method of claim 14, further comprising:
providing an adjustable cam with the first rotational component to determine the first preset position.

18. The method of claim 14, further comprising:
coupling an electrical generator with the primary torsional spring.

19. The method of claim 14, wherein the first arc roller is between 3 and 7 inches in diameter.

20. The method of claim 14, further comprising:
providing between four and seven arc rollers disposed parallel to one another.

21. The method of claim 14, further comprising:
attaching the first arc roller to a pivot point; and
orienting the first arc roller at a first impact pivot angle.

22. The method of claim 21, further comprising:
mounting the pivot point on a ladder mechanism, so that the first impact pivot angle is adjustable.

23. The method of claim 21, further comprising:
connecting the first arc roller to the first rotatable component via a joint, wherein a second angle between: (i) a first plane passing through the joint and the first central axis of rotation of the first arc roller, and (ii) a second plane defining a road surface, represents redirected impact energy.

24. The method of claim 21, wherein a third angle between the first rotatable component and a vertical reference plane represents an outside stroke due to angular impact, the method further comprising:
providing an adjustable link between the first arc roller and the first rotatable component, so as to adjust the third angle.

25. The method of claim 21, wherein a fourth angle comprises an angle of rotation of the first rotatable component due to impact, the method comprising:
selecting a maximum limit of the fourth angle based on the first impact pivot angle and the second angle.

26. The method of claim 14, further comprising:
providing a clutch with the primary torsional spring, wherein the clutch:
is operated by a rotation of the primary torsional spring, and
disengages to drive an alternator when the primary torsional spring reaches a predetermined rotational threshold and unwinds when the clutch disengages.

27. A system for capturing at least a part of kinetic energy (KE) of a moving vehicle upon impact thereof with at least one arc roller, the system comprising:
a first arc roller having a first central axis of rotation, wherein upon being impacted by the moving vehicle the first arc roller is configured to move such that the first central axis of rotation moves along a first arcuate path;
a first linkage linking the first arc roller to a first rotatable component;
a primary torsional spring coupled to the first rotatable component, configured to wind upon at least a partial rotation of the first rotatable component by arcuate movement of the first arc roller and the first central axis of rotation thereof, until the first rotatable component reaches a first preset position;
a first return mechanism to return the first arc roller to an initial position thereof when the first rotatable component reaches the first preset position;
a third arc roller having a third central axis of rotation, wherein upon being impacted by the moving vehicle the third arc roller is configured to move such that the third central axis of rotation moves along a third arcuate path;
a third linkage linking the third arc roller to a third rotatable component;
a third return mechanism to return the third arc roller to an initial position thereof when the third rotatable component reaches a third preset position;
a secondary torsional spring coupled to the third rotatable component, configured to wind upon at least a partial rotation of the third rotatable component by arcuate movement of the third arc roller and the third central axis of rotation thereof; and an alternator coupled to both the primary and secondary torsional springs.

28. A method for assembling a system for capturing at least a part of kinetic energy (KE) of a moving vehicle upon impact thereof with at least one arc roller, the method comprising:

mounting on a frame a first arc roller having a first central axis of rotation, wherein, upon being impacted by the moving vehicle, the first arc roller is configured to move such that the first central axis of rotation moves along a first arcuate path;

coupling a first linkage linking the first arc roller to a first rotatable component;

coupling a primary torsional spring to the first rotatable component, wherein the primary torsional spring is configured to wind upon at least a partial rotation of the first rotatable component by arcuate movement of the first arc roller and the first central axis of rotation thereof;

coupling a first return mechanism to the first arc roller to return the first arc roller to an initial position thereof when the first rotatable component reaches a first preset position;

mounting on the frame a third arc roller having a third central axis of rotation, wherein upon being impacted by the moving vehicle the third arc roller is configured to move such that the third central axis of rotation moves along a third arcuate path;

coupling a third linkage linking the third arc roller to a third rotatable component;

coupling a third return mechanism to return the third arc roller to an initial position thereof when the third rotatable component reaches a third preset position;

coupling a secondary torsional spring to the third rotatable component, wherein the secondary torsional spring is configured to wind upon at least a partial rotation of the third rotatable component by arcuate movement of the third arc roller and the third central axis of rotation thereof; and coupling an alternator to both the primary and secondary torsional springs.

\* \* \* \* \*